US008120882B1

(12) United States Patent
Radosavljevic et al.

(10) Patent No.: US 8,120,882 B1
(45) Date of Patent: Feb. 21, 2012

(54) PROTECTIVE ELECTRICAL WIRING DEVICE WITH LIGHT

(75) Inventors: Dejan Radosavljevic, Lafayette, NY (US); Kenneth D. Vought, Syracuse, NY (US); Gerald R. Savicki, Jr., Canastota, NY (US); Richard Weeks, Little York, NY (US); Gary O. Wilson, Syracuse, NY (US)

(73) Assignee: Pass & Seymour, Inc., Syracuse, NY (US)

( * ) Notice: Subject to any disclaimer, the term of this patent is extended or adjusted under 35 U.S.C. 154(b) by 213 days.

(21) Appl. No.: 12/545,896

(22) Filed: Aug. 24, 2009

Related U.S. Application Data

(63) Continuation of application No. 10/998,369, filed on Nov. 29, 2004, now Pat. No. 7,586,718.

(60) Provisional application No. 60/550,275, filed on Mar. 5, 2004.

(51) Int. Cl.
*H02H 3/00* (2006.01)

(52) U.S. Cl. ........................................................ 361/42

(58) Field of Classification Search ..................... 361/42
See application file for complete search history.

(56) References Cited

U.S. PATENT DOCUMENTS

| | | | |
|---|---|---|---|
| 5,473,517 A | 12/1995 | Blackman | |
| 5,581,158 A | 12/1996 | Quazi | |
| 5,594,398 A * | 1/1997 | Marcou et al. | 335/18 |
| 6,010,228 A | 1/2000 | Blackman et al. | |
| 6,547,411 B1 | 4/2003 | Dornbusch | |
| 6,805,469 B1 | 10/2004 | Barton | |
| 7,149,065 B2 | 12/2006 | Baldwin et al. | |
| 2002/0131262 A1 | 9/2002 | Amburgey | |

* cited by examiner

*Primary Examiner* — Rexford Barnie
*Assistant Examiner* — Ann Hoang
(74) *Attorney, Agent, or Firm* — Daniel P. Malley; Bond Schoeneck & King

(57) ABSTRACT

The present invention is directed to an electrical wiring device that includes an illumination assembly coupled to at least one detection circuit and disposed in the housing portion. The illumination assembly includes at least one light emitting element, an illumination circuit, and at least one lens disposed in at least one lens cover opening in optical communication with at least one light emitting element. The illumination circuit is configured to selectively drive the at least one light emitting element between a deenergized state and a light emitting state in response to an ambient light condition, a miswire condition, an end-of-life condition, a reset state or a trip state. The at least one lens has a surface area such that light emitted by the at least one light emitting element is directed into a spatial volume proximate the electrical wiring device.

39 Claims, 18 Drawing Sheets

PROTECTIVE ELECTRICAL WIRING DEVICE WITH LIGHT

CROSS-REFERENCE TO RELATED APPLICATIONS

This is a continuation of U.S. patent application Ser. No. 10/998,369 filed on Nov. 29, 2004, the content of which is relied upon and incorporated herein by reference in its entirety, and the benefit of priority under 35 U.S.C. §120 is hereby claimed. U.S. patent application Ser. No. 10/998,369 claims the benefit of priority under 35 U.S.C. §119(e) to U.S. provisional application Ser. No. 60/550,275 filed on Mar. 5, 2004, which is incorporated herein by reference in its entirety.

BACKGROUND OF THE INVENTION

1. Field of the Invention

The present invention relates generally to electrical wiring devices, and particularly to electrical wiring devices including protective circuitry.

2. Technical Background

Electrical wiring devices often include power receptacles that may receive a corded plug to thereby supply power to electrical equipment connected to the plug. In certain environments where a greater potential for an electrical shock hazard may exist, such as in a residential bathroom or kitchen, for example, the wiring device may be equipped with a circuit protection device component, e.g., a ground fault circuit interrupter (GFCI) (however, the use of wiring devices having a circuit protection device component or capability is in no way limited to these exemplary environments). Their intended purpose is to protect the electrical power user from electrocution when hazardous ground fault faults are present. Protective devices or device components may be effective in detecting ground faults associated with damaged insulation on the line conductor that could lead to fire, or to current accidentally flowing through a human body that could cause electrocution. In general, a GFCI senses and/or responds to a condition in a line carrying electrical current, which indicates a presently or imminently dangerous condition such as the presence of a current path other than the intended path of normal operation. Response to the sensed dangerous condition maybe in the form of alarm actuation and/or opening the line (interrupting the circuit) between the source of power and the load.

Protective device components are typically provided with line terminals for coupling to the supply voltage of the electrical distribution system, and load terminals coupled to the protected portion of the system and a circuit interrupter for disconnection of the load terminals from the line terminals. The protective device may be provided with a sensor for sensing the fault, a detector for establishing if the sensed signal represents a true hazardous fault, as opposed to electrical noise, and a switch responsive to the detector sensor, wherein the circuit interrupter comprising the contacts of a relay or trip mechanism are operated by a solenoid responsive to the switch to disconnect the load terminals from the line terminals. The disconnection is also known as tripping. A power supply may be required to furnish power to the sensor, detector, switch or solenoid.

Protective device components are commonly equipped with a test button, which the owner of the protective device is instructed to operate periodically to determine the operating condition of the sensor, the detector, the switch, trip mechanism or relay, or power supply, any of which can fail and which may cause the circuit interrupter to not operate to remove power from the load side of the protective device to interrupt the fault. Since the protective device component includes both electronic and mechanical components, failure modes may result from normal aging of electronic components, corrosion of mechanical parts, poor connections, mechanical wear, mechanical or overload abuse of the protective device in the field, electrical disturbances such as from lightning, or the like. Once the test has been manually initiated by operating the test button, the outcome of the test has often been indicated mechanically such as by a popping out of a button, visually through a lamp display or pivoting flag that comes into view, or audibly through an annunciator. As an alternative to a manual test, a self-test feature can be added to the protective device for automatic testing such as is described in U.S. Pat. No. 6,421,214 and U.S. application Ser. No. 09/827,007 filed Apr. 5, 2001 entitled LOCKOUT MECHANISM FOR USE WITH GROUND AND ARC FAULT CIRCUIT INTERRUPTERS, both of which are incorporated herein by reference in their entirety. Once the test has been automatically initiated through the self-test feature, the outcome of the test can be indicated by any of the previously described methods or by the permanent disconnection of the load terminals from the line terminals of the protective device component, also known as lock-out."

Further variations on circuit protection device components exist. For example, commonly assigned copending application Ser. No. 10/768,530, filed on Jan. 30, 2004, entitled CIRCUIT PROTECTION DEVICE WITH GROUNDED NEUTRAL HALF CYCLE SELF TEST teaches a circuit protection device that self-checks for ground fault detection every half cycle. Commonly assigned copending application Ser. No. 10/729,392, entitled PROTECTION DEVICE WITH LOCKOUT TEST teaches a device that protects from arc faults and ground faults, which is provided with a manual test feature that permanently denies power to the protected circuit should the test fail. Commonly assigned U.S. Pat. No. 6,522,510 and U.S. application Ser. No. 09/718,003 filed Nov. 21, 2000, entitled GROUND FAULT CIRCUIT INTERRUPTER WITH MISWIRE PROTECTION AND INDICATOR teaches a ground fault interrupter device with miswire protection and indicator functions. These three applications are hereby incorporated by reference in there entireties to the fullest extent allowed by applicable laws and rules.

The exemplary bathroom and kitchen environments referred to above also represent locations that occupants may visit during night time hours when these rooms are typically dark. As such, it is common to find a "night light" plugged into an electrical receptacle to provide some increased visibility in the darkness. Night light devices have various forms, styles, and designs. They all include either an on/off switch for manual operation, or a sensor that senses ambient light conditions to control the on/off state of the light. An example of a night light having a sensor is disclosed in U.S. Pat. No. 6,561,677, which is herein incorporated by reference in its entirety.

In view of the foregoing information, the applicant has become appreciative of the various economies and other advantages and benefits presented by an electrical wiring device including a circuit protection component and an auxiliary, integrated light that provides lighting and/or circuit status indication.

SUMMARY OF THE INVENTION

The present invention addresses the needs described above by providing an electrical wiring device including a circuit protection component and an auxiliary, integrated light that provides lighting and/or circuit status indication.

One aspect of the present invention is directed to an electrical wiring device that includes a housing portion that has a plurality of line terminals and a plurality of load terminals accessible from external portions thereof. The housing portion further includes a separator member, the plurality of line terminals being disposed on a first side portion of the separator member, the plurality of load terminals also including a plurality of receptacle terminals disposed on a second side portion of the separator member. A cover portion is coupled to the housing portion. The cover portion includes a plurality of receptacle openings selectively coupled to the plurality of line terminals in an operative state. The cover portion also includes a user-accessible device control region disposed proximate the plurality of receptacle openings. The cover portion further includes at least one lens cover opening. A portion of the at least one first lens cover opening having a first edge juxtaposed with the user-accessible device control region and a second edge substantially disposed along a peripheral edge of the cover portion. An interrupting contact assembly includes four sets of interrupting contacts that are configured to provide electrical continuity between the plurality of line terminals and the plurality of load terminals in a reset state and configured to interrupt the electrical continuity in a tripped state. At least one detection circuit is disposed in the housing portion on the first side portion of the separator member and coupled to the plurality of line terminals or the plurality of load terminals. The at least one detection circuit is configured such that the interrupting contact assembly is substantially prevented from effecting the reset state in the event of a miswired condition, an end-of-life condition, or a fault condition. An illumination assembly is coupled to the at least one detection circuit and disposed in the housing portion. The illumination assembly includes at least one light emitting element, an illumination circuit, and at least one lens disposed in the at least one lens cover opening in optical communication with the at least one light emitting element. The illumination circuit is configured to selectively drive the at least one light emitting element between a deenergized state and a light emitting state in response to an ambient light condition, the miswire condition, the end-of-life condition, the reset state or the trip state. The at least one lens having a surface area that is a function of the first edge juxtaposed with the user-accessible device control region and the second edge substantially disposed along a peripheral edge of the cover portion such that light emitted by the at least one light emitting element is directed into a spatial volume proximate the electrical wiring device.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description are merely exemplary of the invention, and are intended to provide an overview or framework for understanding the nature and character of the invention as it is claimed. The accompanying drawings are included to provide a further understanding of the invention, and are incorporated in and constitute a part of this specification. The drawings illustrate various embodiments of the invention, and together with the description serve to explain the principles and operation of the invention.

DETAILED DESCRIPTION

Figure 1:
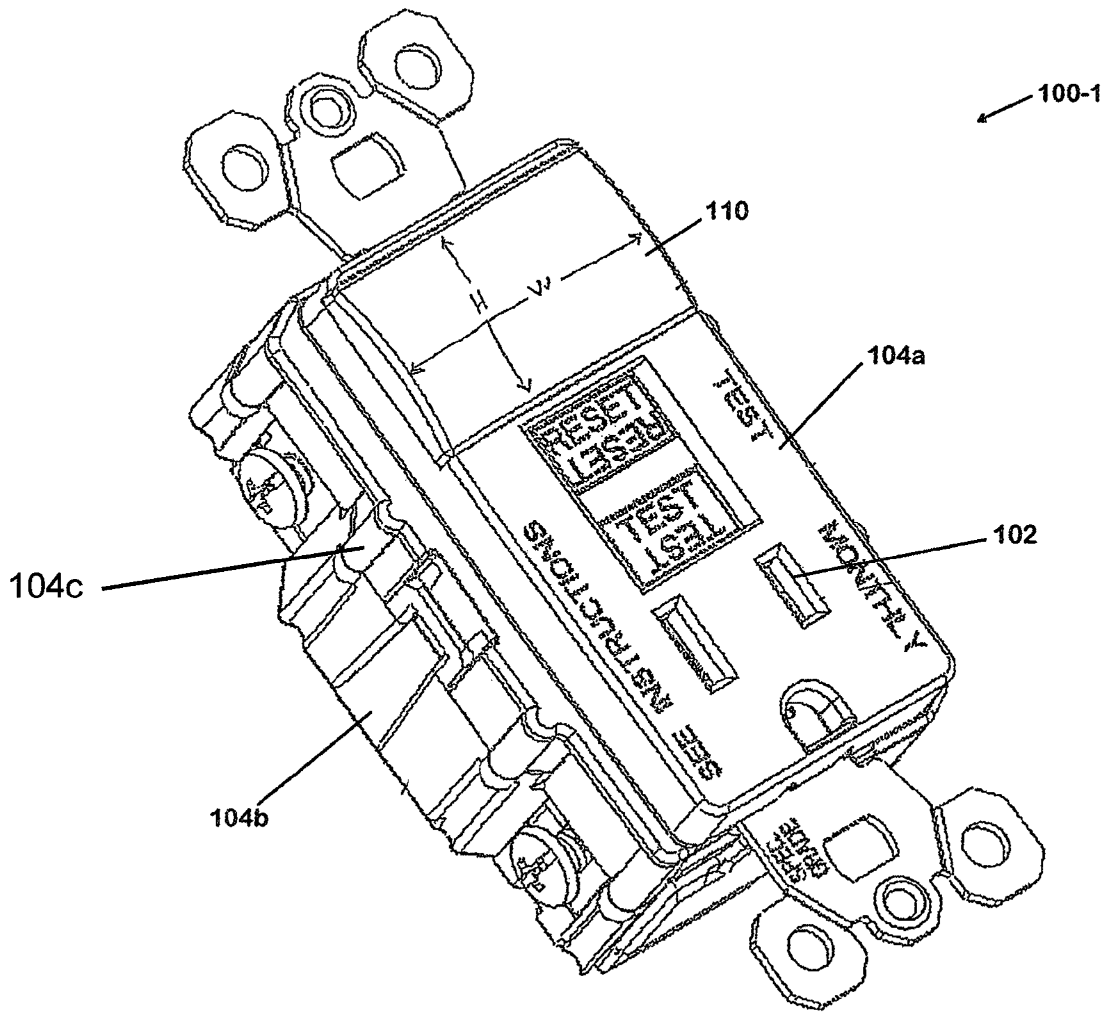
FIG. 1 is a perspective line drawing of an electrical device according to an exemplary embodiment of the invention.

Reference will now be made in detail to the present exemplary embodiments of the invention, examples of which are illustrated in the accompanying drawings. Wherever possible, the same reference numbers will be used throughout the drawings to refer to the same or like parts. An exemplary embodiment of the electrical wiring device of the present invention is shown in FIG. 1, and is designated generally throughout by reference numeral 10.

Figure 2:
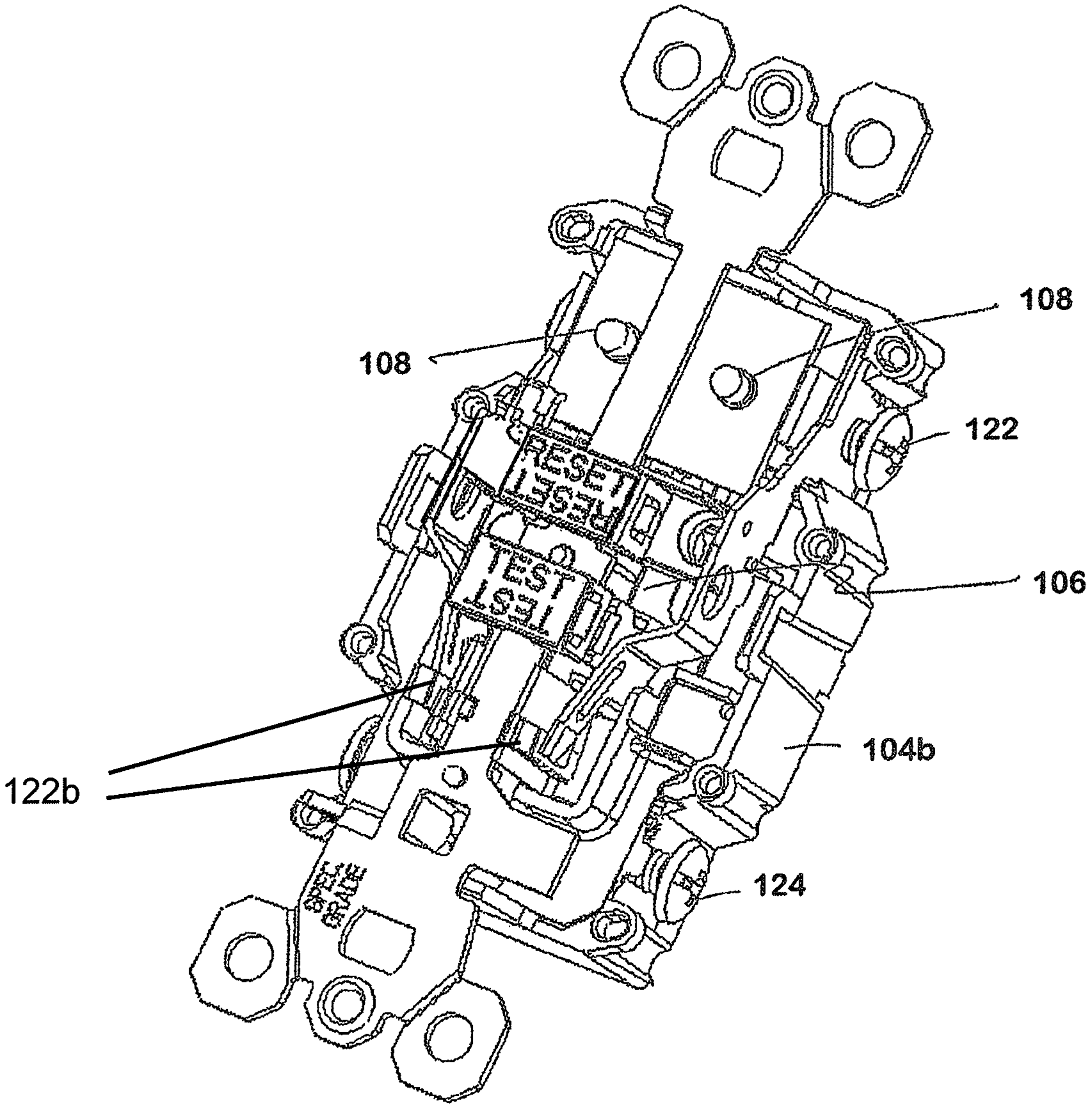
FIG. 2 is a perspective line drawing of the interior of the electrical device illustrated in FIG. 1.

An embodiment according to the invention is now described with initial reference to FIGS. 1 and 2. FIG. 1 shows an assembled perspective illustration of an exemplary electrical wiring device 100-1 having grounded receptacle openings 102. The electrical wiring device 100-1 includes a housing 104 having a face portion 104*a*, a back portion 104*b*, and a separator portion 104*c* disposed therebetween. Receptacle openings 102 are formed in the face/cover portion 104*a*. Line terminals 124 are disposed in the back portion 104*b* of the housing 104 underneath the bottom side of the separator member 104*c*. Device 100-1 also includes load terminals 122. The load terminals 122 are formed such that receptacle terminals 122*b* are disposed over the upper side of the separator member 104*c* and in spatial alignment with receptacle openings 102. The device 100-1 also includes a circuit protection component 106 (described in greater detail below) contained within the housing, and a light source 108, as shown in FIG. 2, contained within the housing. The light source 108 is covered by a lens cover 110 illustrated in FIG. 1 and is therefore, disposed within the cover portion 104*a* above the upper side of separator 104*c*. In an aspect of the embodiment, the light source 108 can provide an increased illumination in an environment surrounding the electrical wiring device. In this aspect, the light source would be coupled to the line terminals 124 (FIG. 2), such that the light source is in an "on" state continuously as long as line power is being supplied to the device. In another aspect, the light source could function to provide an increased illumination in an environment surrounding the electrical wiring device in response to a predetermined condition. In this aspect, the light source would be coupled to the device so as to be in an "on" state continuously as long as line power is being supplied to the device, and the circuit protection component is in a "tripped" state due to a predetermined condition.

The light source 108 in all of the disclosed embodiments may be an LED. In alternative aspects, the light source may be a neon source, an incandescent source, or any other suitable source of illumination as a person skilled in the art will appreciate. The light source may be a single-unit source or a multi-unit source as shown, for example, as twin LEDs 108 in FIG. 2. The wavelength of the illumination produced by the light source will depend upon the type of source used, and can be selected as appropriate to the function being performed by the light source; e.g., a night-light, a status indicator, a room illuminator, etc. In another aspect of the embodiment, the light source may include terminals or wire leads that the installer connects to other terminals of the device.

In all of the disclosed embodiments, the lens cover 110 may be made of a clear or translucent material as a skilled person will appreciate as being best suited to factors such as the type of light source, the wavelength radiated by the light source, the desired intensity, or softness, of the illumination, the function of the light, and other considerations. In an aspect, the lens cover 110 is removable from the housing 104*a* for access to the light source 108. In another aspect of all of the disclosed embodiments, the lens cover 110 has a height dimension, H, of not less than about 0.4 inch and a width, W, that substantially equals the width of the face portion of the housing 104*a* as shown, for example, in FIGS. 1, 4, 5 and 6.

Additional embodiments of the invention will now be set forth, and thereafter exemplary circuit protection components 106-*n* and associated circuits will be presented. It is to be appreciated that the design per se of the circuit protection component is not meant to limit the embodied invention in any way. Thus various circuit protection components in the form of ground fault circuit interrupters (GFCIs) and arc fault circuit interrupters (AFCIs), for example, as known in the art, as may be disclosed herein, or as described in commonly assigned copending applications incorporated herein by reference, will be suitable as persons skilled in the art will appreciate.

Figure 3:
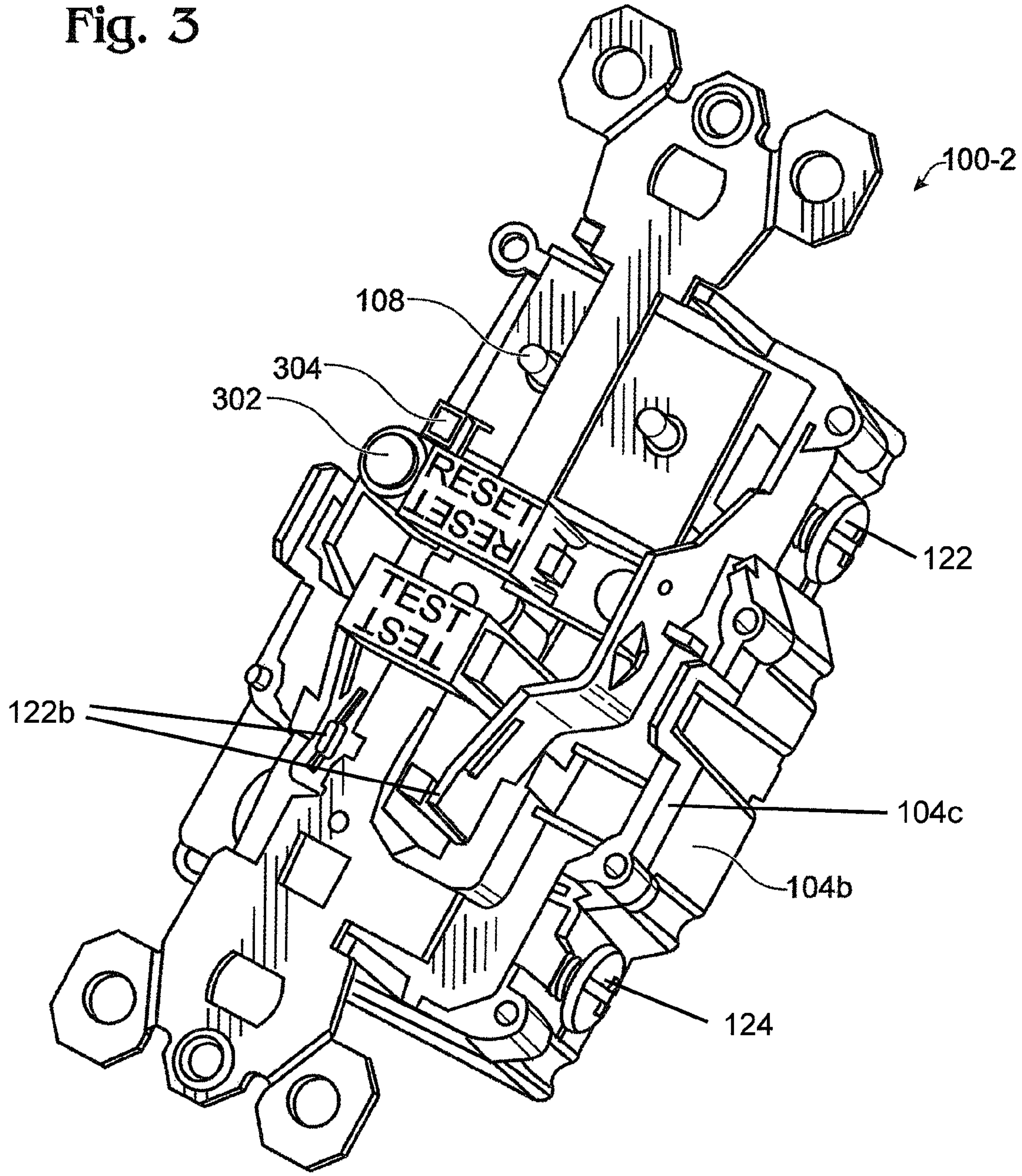
FIG. 3 is a perspective drawing of the interior of an electrical device according to another exemplary embodiment of the invention.
Figure 4:
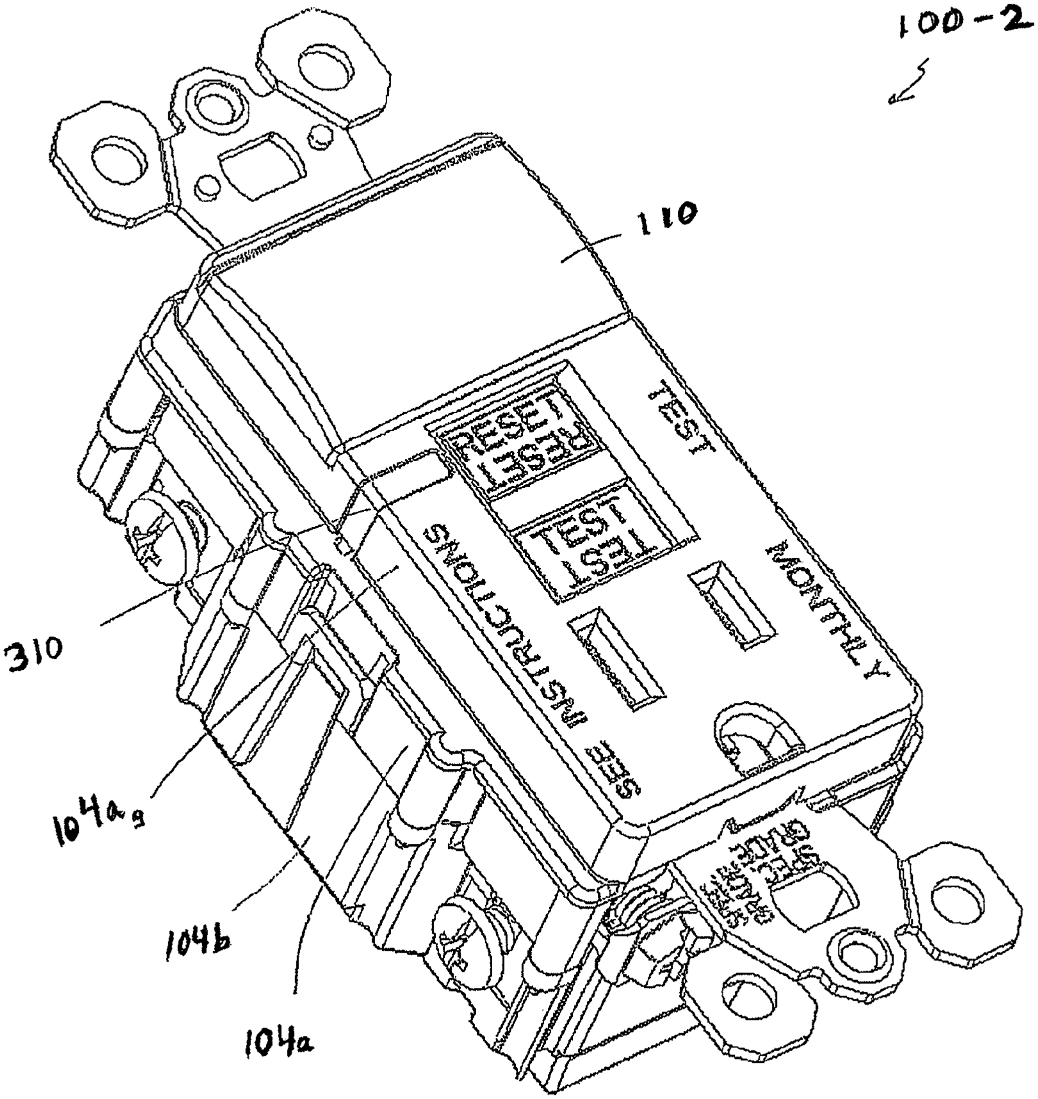
FIG. 4 is a perspective line drawing of the electrical device assembly illustrated in FIG. 3.

In another embodiment illustrated in FIGS. 3 and 4, an electrical wiring device 100-2 has all of the features described with reference to device 100-1 shown in FIGS. 1 and 2, and in addition includes a light source sensor 302 mounted within the housing and operably connected to the light source 108 for controlling an on/off state of the light source dependent upon an ambient light condition in the environment of the electrical wiring device. A lead 304 of light source 108 may be connected to receptacle 102. Such electrical connection may be accomplished by way of crimping, soldering, welding or press-fitting, and the like. As shown in FIG. 4, a light source sensor lens cover 310 covers the light source sensor 302. In an aspect, the light source sensor and light source sensor lens cover are located outside of a region occupied by the lens cover 110. One exemplary advantage of such placement is the shielding of the sensor from light pollution produced by the light source 108. In an aspect of the embodiment, light source sensor lens cover 310 extends around a portion of a side 104 as of the face portion 104*a* of the housing as illustrated in FIG. 4. In an alternative aspect, a wall-structure or other physical barrier prevents light contamination.

Figure 5:
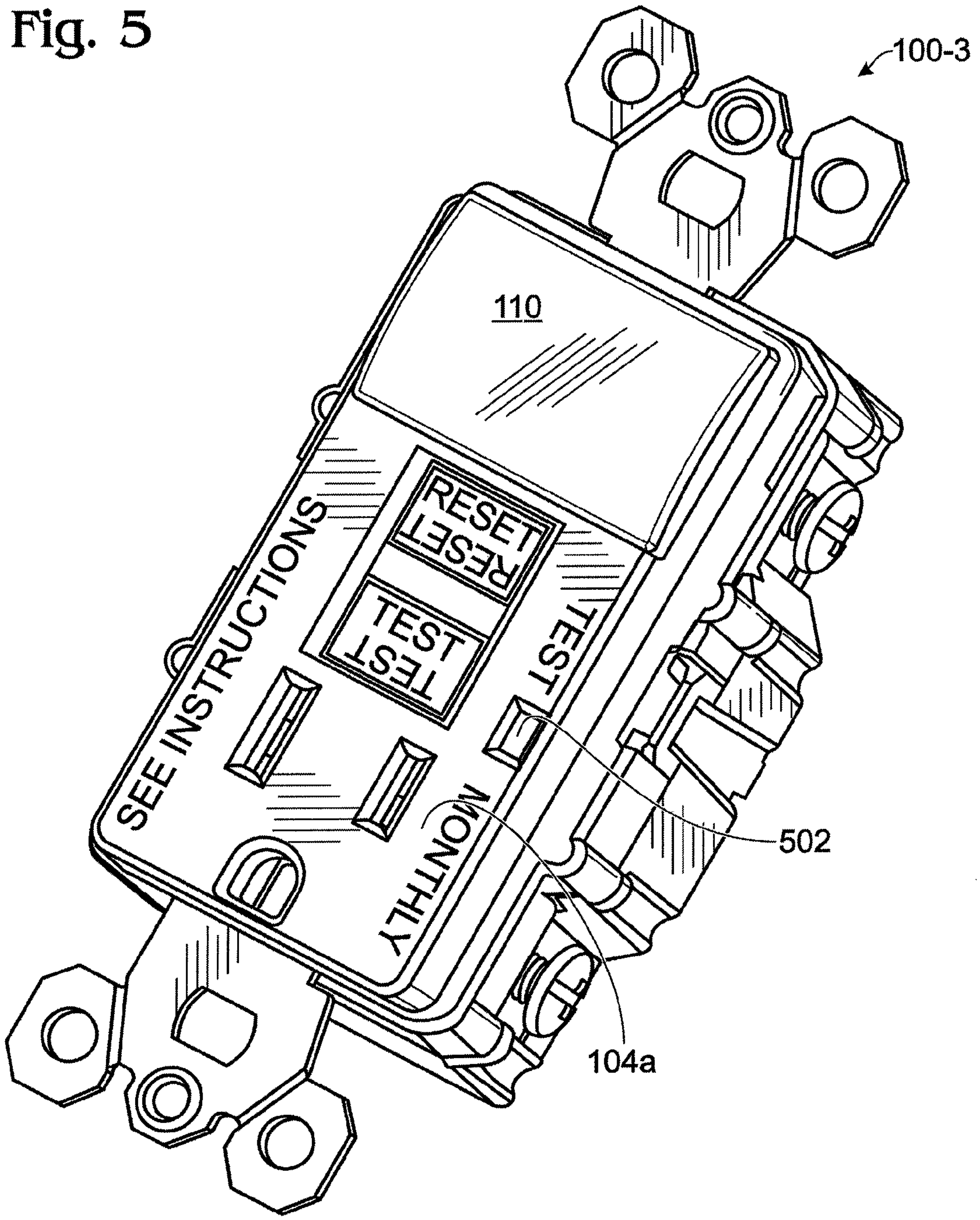
FIG. 5 is a perspective line drawing of an electrical device according to another exemplary embodiment of the invention.
Figure 6:
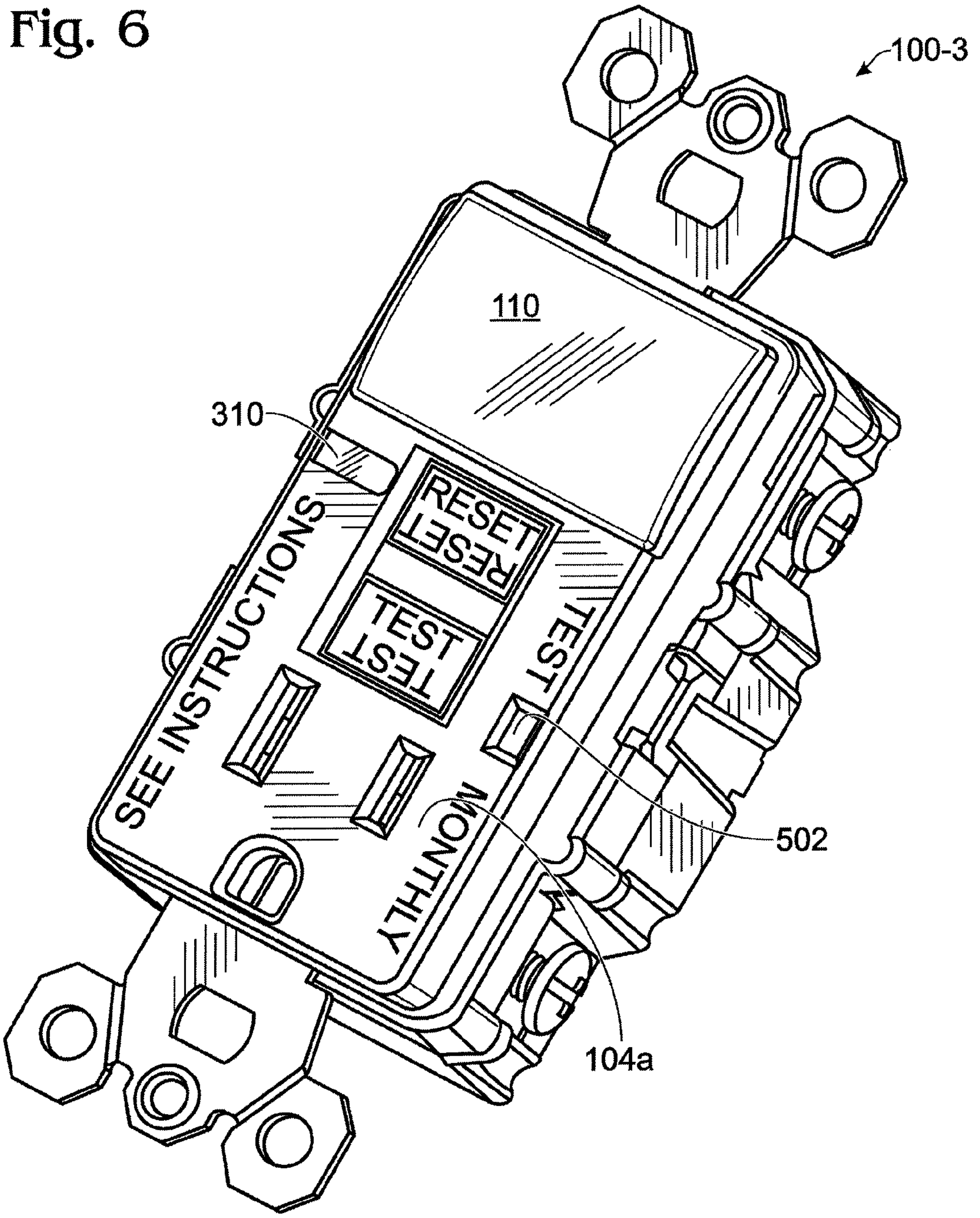
FIG. 6 is a perspective line drawing of an electrical device according to another exemplary embodiment of the invention.

Another embodiment of the invention as illustrated in FIG. 5 is directed to an electrical wiring device 100-3 having, in one aspect, all of the features described with reference to device 100-1 shown in FIGS. 1 and 2, and in addition includes a trip indicator 502 mounted in and visible through the housing 104*a* for indicating the status of the circuit protection component. In an alternative aspect illustrated in FIG. 6, the electrical wiring device 100-3' has all of the features described with reference to device 100-2 shown in FIGS. 3 and 4, and in addition includes a trip indicator 502 mounted in and visible through the housing 104*a* for indicating the status of the circuit protection component. The trip indicator 502, described in greater detail below with respect to the circuit protection component, can be a trip-light source, such as an LED, a neon source, or other suitable light source. A person skilled in the art will appreciate that different wiring permutations are possible for creating ON and OFF state combinations between the light source 108 and the trip indicator light source 502. The trip light source 502 may emit a similar or a different color of light as the light source 108, vary in intensity, or otherwise have characteristics in common, or not, with the light source 108. In an aspect, the trip light source may be on continuously in an ON state or may blink in an ON state. In alternative aspects, the trip indicator need not be a light source, but rather could be an audible signal or indicator flag, as examples, as further described below.

Circuit Protection Device Components

An electrical distribution system typically includes a circuit breaker, branch circuit conductors, wiring devices, cord sets or extension cords, and electrical conductors within an appliance. A protective device typically is incorporated in an electrical distribution system for protecting a portion of the system from electrical faults. GFCIs are one type of protective device that provide a very useful function of disconnecting an electrical power source from the protected portion of the system when a ground fault is detected. Among the more common types of ground faults sensed by known GFCIs are those caused when a person accidentally makes contact with a hot electrical lead and ground. In the absence of a GFCI, life-threatening amounts of current could flow through the body of the person.

AFCIs are another type of protective device. AFCIs disconnect an electrical power source from a load when an arc fault is detected. Among the more common type of arc faults sensed by known AFCIs are those caused by damaged insulation such as from an overdriven staple. This type of arc fault occurs across two conductors in the electrical distribution system such as between the line and neutral conductors or line and ground conductors. The current through this type of fault is not limited by the impedance of the appliance, otherwise known as a load coupled to the electrical distribution system, but rather by the available current from the source voltage established by the impedance of the conductors and terminals between the source of line voltage and the position of the fault, thus effectively across the line, and has been known as a "parallel arc fault." Another type of arc fault sensed by known AFCIs are those caused by a break in the line or neutral conductors of the electrical distribution system, or at a loose terminal at a wiring device within the system. The current through this type of fault is limited by the impedance of the load. Since the fault is in series with the load, this type of fault has also been known as a "series arc fault." In the absence of an AFCI, the sputtering currents associated with an arc fault, whether of the parallel, series, or some other type, could heat nearby combustibles and result in fire.

Protective devices are typically provided with line terminals for coupling to the supply voltage of the electrical distribution system, and load terminals coupled to the protected portion of the system and a circuit interrupter for disconnection of the load terminals from the line terminals. The protective device is provided with a sensor for sensing the fault, a detector for establishing if the sensed signal represents a true hazardous fault, as opposed to electrical noise, and a switch responsive to the detector sensor, wherein the circuit interrupter comprising the contacts of a relay or trip mechanism are operated by a solenoid responsive to the switch to disconnect the load terminals from the line terminals. The disconnection is also known as "tripping". A power supply may be required to furnish power to the sensor, detector, switch or solenoid.

In one approach, a protective device is equipped with a test button, which the owner of the protective device is instructed to operate periodically to determine the operating condition of the sensor, the detector, the switch, trip mechanism or relay, or power supply. Any of these components may fail and cause the circuit interrupter to fail to remove power from the load side of the protective device to interrupt the fault. Since the protective device comprises electronic and mechanical components, failure may occur because of normal aging of the electronic components, corrosion of the mechanical parts, poor connections, mechanical wear, mechanical or overload abuse of the protective device in the field, electrical disturbances (e.g., lightning), or for other reasons. Once the test has been manually initiated by operating the test button, the outcome of the test may be indicated mechanically by a button, or visually through a lamp display or pivoting flag that comes into view, or audibly through an annunciator.

In another approach, a self-test feature can be added to the protective device for automatic testing as an alternative to a manual test. Once the test has been automatically initiated through the self-test feature, the outcome of the test can be indicated by any of the previously described methods or by the permanent disconnection of the load terminals from the line terminals of the protective device, also known as "lockout."

Figure 7:
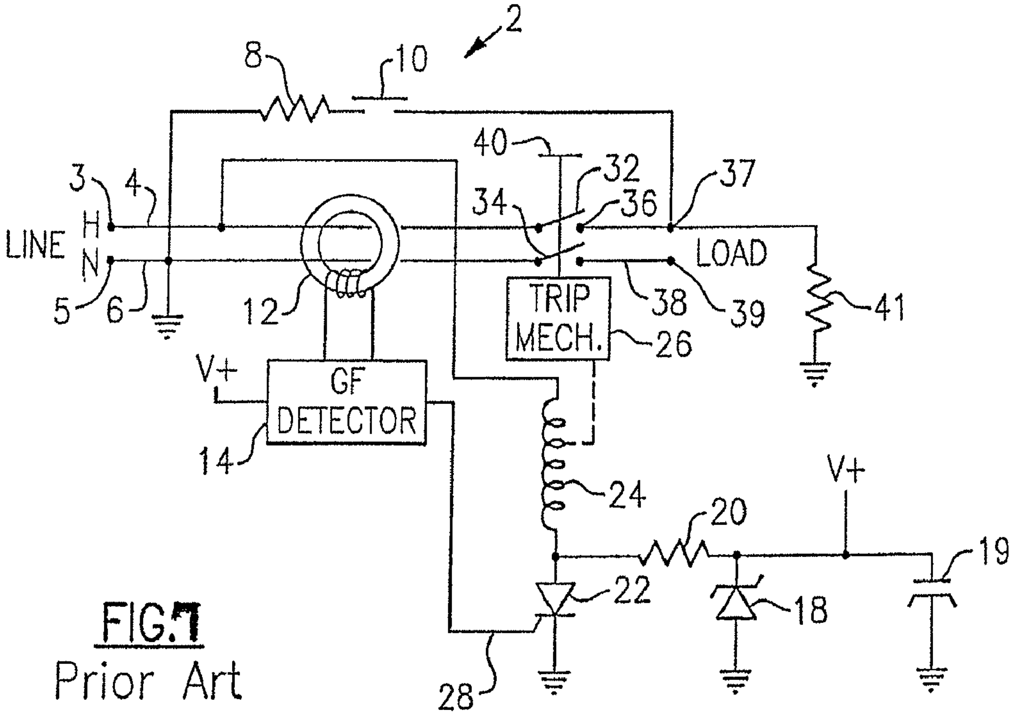
FIG.7 Prior Art
FIG. 7 shows a circuit diagram for an exemplary ground fault circuit interrupter (GFCI)

Another approach that has been considered is depicted in FIG. 7. GFCI 2 includes line terminals 3 and 5 for coupling to a power source of the electrical distribution system and load terminals 37 and 39 appropriate to the installed location, whether a circuit breaker, receptacle, plug, module, or the like. A ground fault represented by resistor 41 produces an additional current in conductor 4 that is not present in conductor 6. Sensor 12 senses the difference current between conductors 4 and 6, which is then detected by a ground fault detector 14. Detector 14 issues a trip command to a silicon controlled rectifier 22 (SCR) that in turn activates a solenoid 24, which activates a trip mechanism 26 releasing contact armatures 34 and 32, thereby disconnecting power to the load by breaking the circuit from a line hot 4 to a load hot 36 and from a line neutral 6 to a load neutral 38. A contact 10 along with a resistor 8 form a test circuit that introduces a simulated ground fault. When contact 10 is depressed, the additional current on conductor 4 is sensed by sensor 12 as a difference current causing the device to trip. Current flows through resistor 8 for the interval between depression of the contact 10 and the release of contact armatures 34 and 32, which is nominally 25 milliseconds. The device is reset by pressing a reset button 40, which mechanically resets trip mechanism 26. A resistor 20, a Zener 18, and a capacitor 19 form a power supply for GFCI 2.

Figure 8:
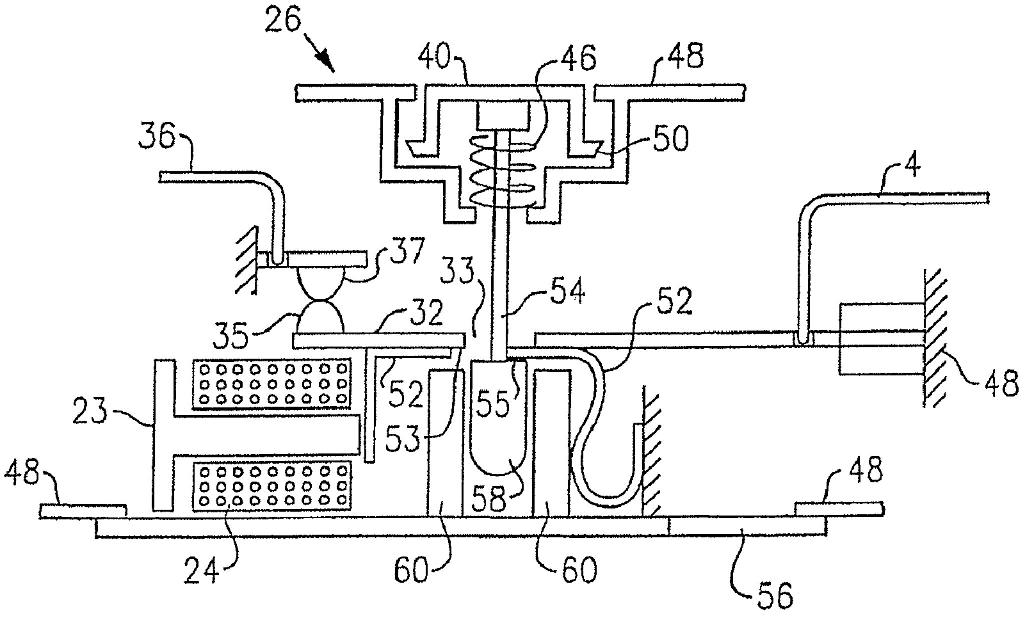
FIG.8 Prior Art
FIG. 8 shows a partial sectional view of a mechanical implementation of the schematic of FIG. 7.

Referring to FIG. 8, the mechanical layout for the circuit diagram of FIG. 7 is shown in which like elements are like numbered. Trip mechanism 26 is shown in the set state, meaning that contacts 37 and 35 are closed. Contacts 35 and 37 are held closed by action of a trapped make-force spring 46 acting on an escapement 55 on a rest stem 54 to lift a reset latch spring 52 and by interference, an armature 32. Reset latch spring 52 includes a hole 53 and armature 32 includes a hole 33, which holes 33 and 53 permit entry of a tip 58 of reset stem 54. Reset stem 54 is held in place by a block 60. Armature 32 and a printed circuit board (PCB) 56 are mechanically referenced to a housing 48 so that the force in spring 46 is concentrated into armature 32.

Figure 9:
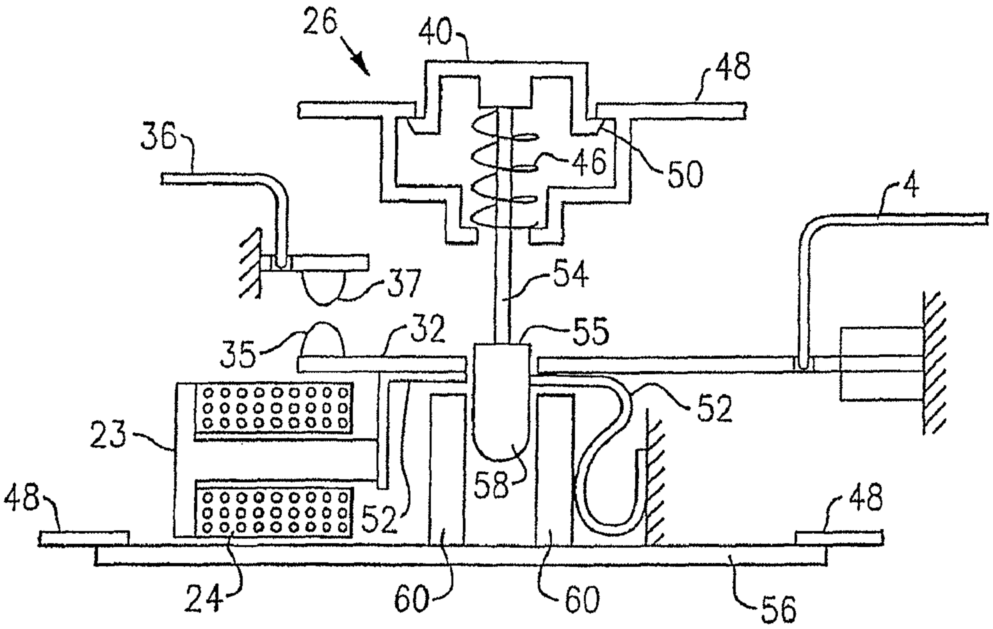
FIG. 9 Prior Art
FIG. 9 shows the mechanical implementation of FIG. 8 in a tripped state.

Referring to FIG. 9, the mechanism of FIG. 8 is shown in the tripped state. The tripped state occurs when SCR 22 activates a magnetic field in solenoid 24, which in turn pulls in plunger 23 to displace reset latch spring 52. Displacing reset latch spring 52 allows a flat portion 55 to clear the latch spring 53 interference, which then releases the interference between latch spring 52 and armature 32. Armature 32 has a memory that returns armature 32 to a resting position against solenoid 24, opening contacts 35 and 37 and disconnecting power to the load.

An exemplary embodiment of another GFCI is shown in FIGS. 10-19 and is designated herein by reference numeral 2.

Figure 10:
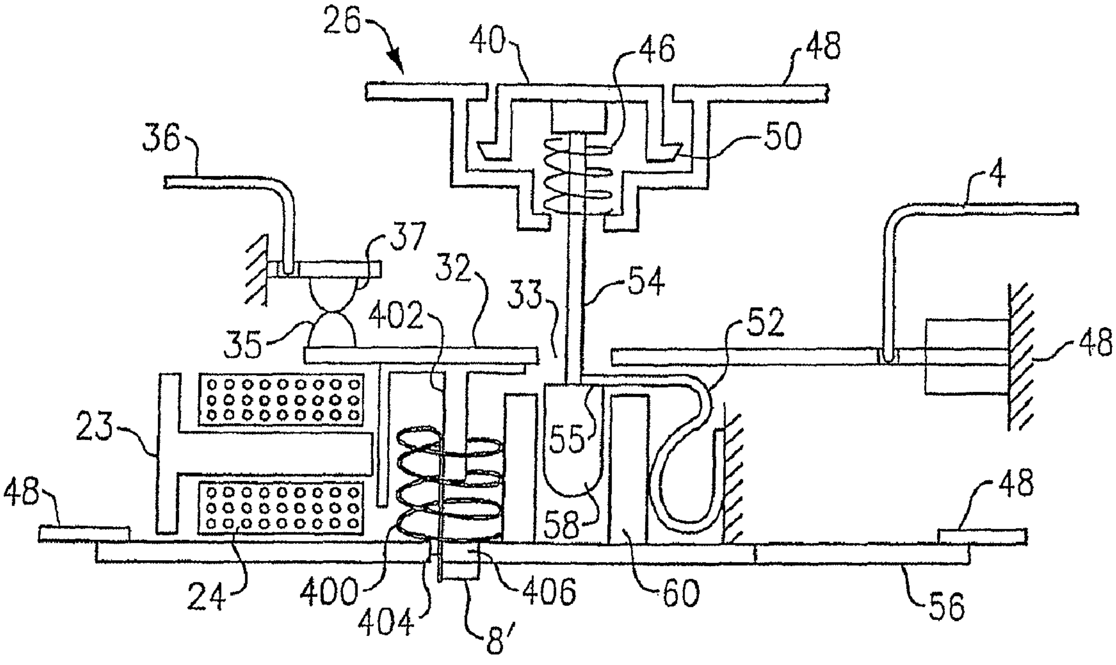
FIG. 10 shows a partial sectional view of a mechanical implementation of an exemplary circuit protection component.

Referring to FIG. 10, a partial sectional view of a mechanical implementation of an embodiment of the invention is shown. A resistor 8', shown schematically in FIG. 7 as resistor 8, is designed to withstand self-heating that results from each depression of contact 10, which causes current to flow through resistor 8' for the expected trip time of the GFCI. For example, resistor 8' for a 6 mA GFCI coupled to a 120V AC supply is required by UL to be 15 KOhms, which dissipates nominally 0.96 W during each trip time interval. In particular, resistor 8' must survive several thousand trip time intervals accomplished by depressing contact 10 and reset button 40 alternately. During normal operation of GFCI 2, resistor 8' is physically positioned to restrain lockout spring 400. Resistor 8' is preferably mounted and soldered so that the body of resistor 8' impedes movement of lockout spring 400.

Figure 11:
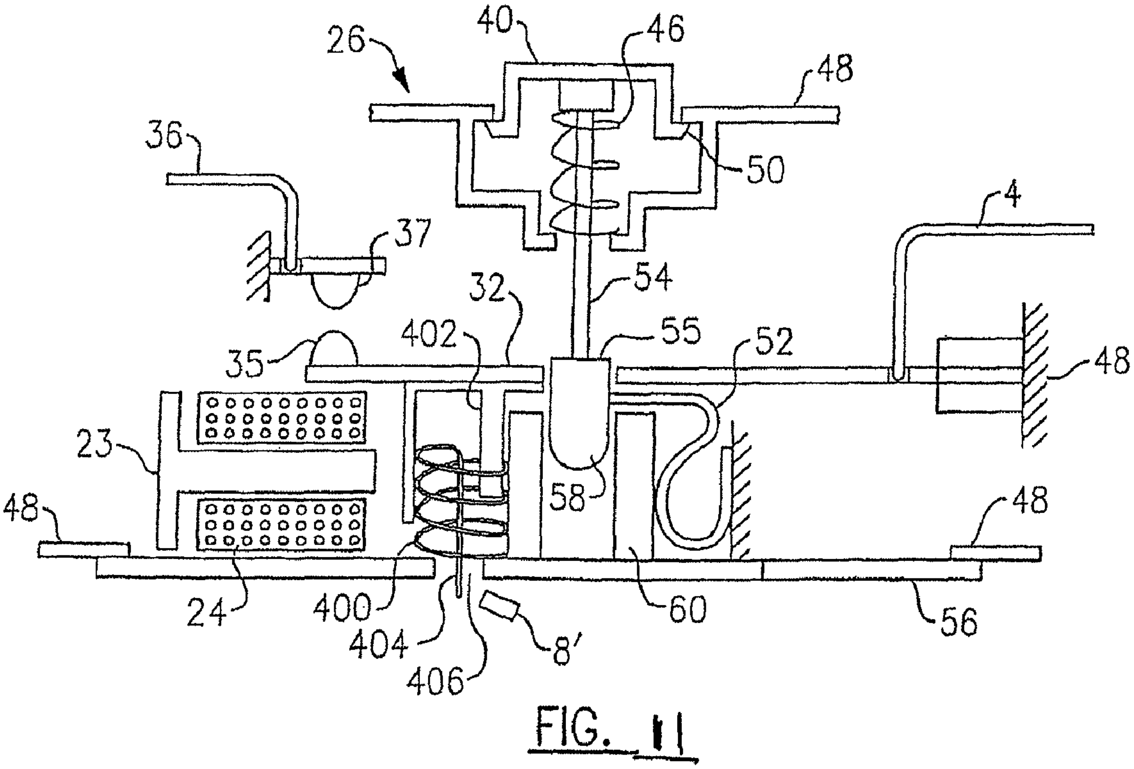
FIG. 11 shows a partial sectional view of the mechanical implementation of the present invention.

Referring to FIG. 11, a partial sectional view of the mechanical implementation of FIG. 10 is shown in the lockout position. The GFCI 2 has failed in some manner such that the trip time in response to depressing contact 10 is greater than the expected interval including failure of GFCI 2 to trip altogether. Examples of failure modes include a defective sensor 12, and for a sensor 12 comprising a transformer, open or shorted turns. The detector 14, typically composed of electronic components, may have poor solder connections or components that have reached end of life. The SCR 22 may short circuit either due to reaching end of life or due to a voltage surge from a lightning storm, thereby causing continuous current through solenoid 24 which burns open through over activation, or, alternatively, SCR 22 may open circuit. The mechanical components associated with trip mechanism 26 may become immobilized from wear or corrosion. The power supply, if provided, may fail to deliver power in accordance with the design such that sensor 12, detector 14, SCR 22, or solenoid 24 are non-operative.

When failure of GFCI 2 occurs, the current through resistor 8' flows for the time that contact 10 is manually depressed, on the order of at least seconds, which is two orders of magnitude longer than if the trip mechanism 26 were to operate in response to depressing contact 10. Resistor 8', which is preferably coupled electrically to GFCI 2 through solder, heats from the current and melts the solder. Resistor 8', no longer restrained by the solder, or in an alternative embodiment by an adhesive, is physically dislodged by the bias of lockout spring 400. Force is then applied by an end 404 of lock-out spring 400 against a feature on the reset latch spring 52, for example, a tab 402. The force in lockout spring 400 is greater than the force in reset latch spring 52. As previously described, reset latch spring 52 is displaced allowing a flat portion 55 to clear the latch spring 53 interference, which then releases the interference between reset latch spring 52 and armature 32. Armature 32 has a memory that returns armature 32 to a resting position against solenoid 24, opening contacts 35 and 37 and disconnecting power to the load. Thus when the GFCI 2 is operational, the tripping mechanism 26 is able to operate, and the armatures 32 and 34 disconnect when plunger 23 applies force to reset latch spring 52. If GFCI 2 is not operative, lockout spring 400 applies force to reset latch spring 52, likewise causing armatures 32 and 34 to disconnect. When GFCI 2 is tripped under the influence of lockout spring 400, armatures 32 and 34 are permanently disconnected irrespective of depressing contact 10 or reset button 40 or any further movement in plunger 23.

Figure 12:
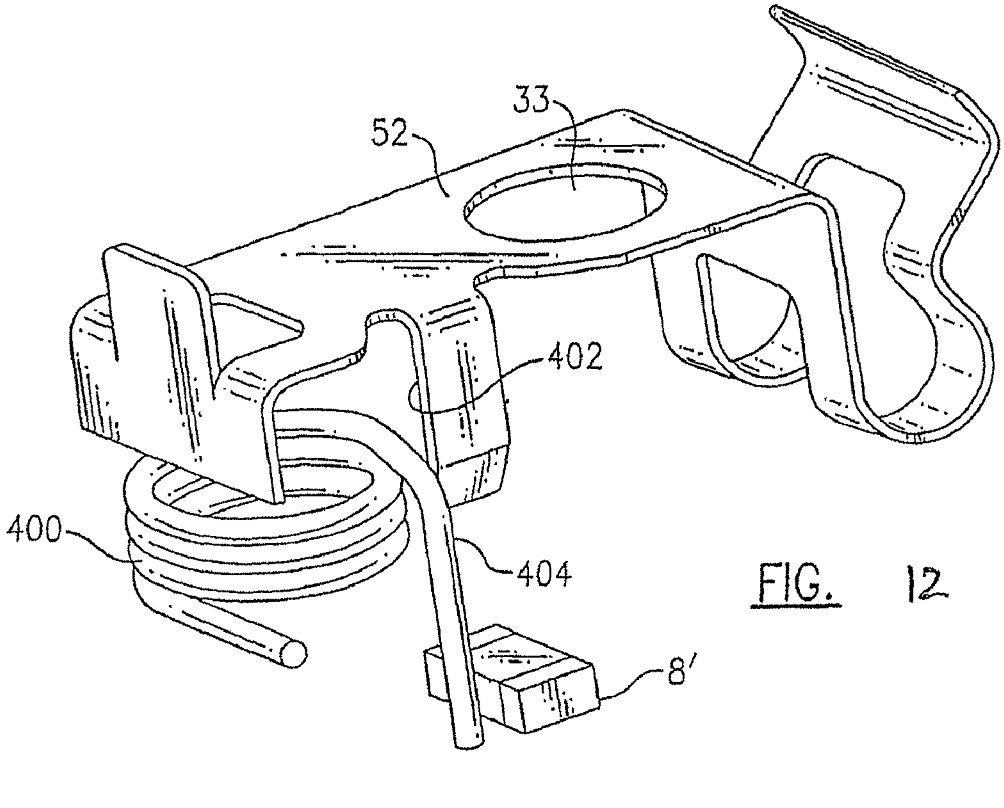
FIG. 12 shows a three-dimensional view of some of the components of the exemplary component of FIG. 10.

Referring to FIG. 12, components of the embodiment of FIG. 10 are shown in a three-dimensional view including lockout spring 400, end 404, resistor 8', and latch spring 52. Spring 404 is preferably affixed to the same structure as resistor 8'.

Figure 13:
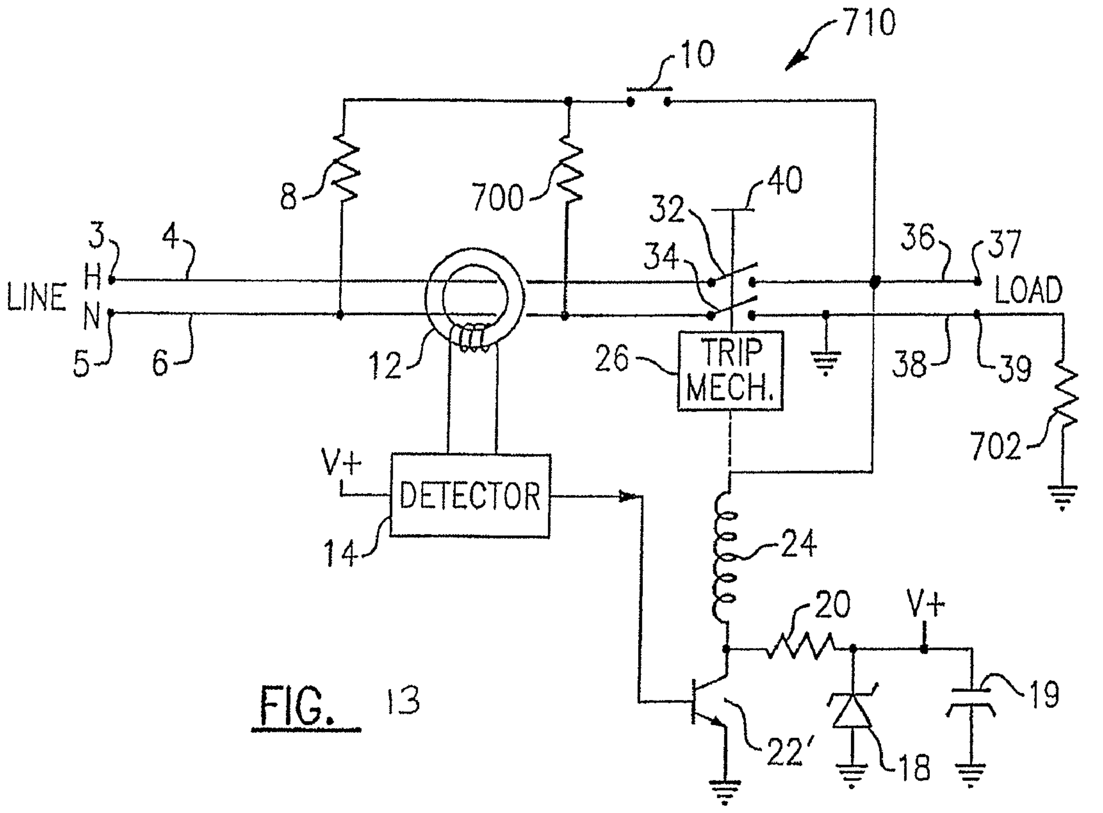
FIG. 13 is a schematic circuit diagram of another exemplary protective device.

Referring to FIG. 13, a protective device 71 0 shows a resistor 700, which is then used as the resistor body that constrains spring 400. There are other ground fault circuit interrupters whose trip thresholds are greater than 6 mA, intended for a variety of supply voltages or phase configurations, and intended for personal protection or fire prevention. Alternative trip levels typically include 30 mA in the US. or Europe, or 300 or 500 mA in Europe. For devices where the current through resistor 8 may produce insufficient heat during the anticipated duration that contact 10 is manually depressed to melt the solder, resistor 8 can be supplemented by a resistor 700 in parallel with resistor 8, which connects to line 6 on the other side of sensor 12 [Tom where resistor 8 connects to line 6. Currents through resistors 8 and 700 are enabled by depressing contact 10. Resistor 8 generates a simulated test signal comprising a difference current to test GFCI 2 as previously described. Resistor 700 is coupled so as to conduct common mode current but no difference current. Since the current through resistor 700 does not influence the amount of simulated test current required by UL, which is set by the value of resistor 8, the value of resistor 700 can be whatever value is convenient for producing sufficient heat in resistor 700 when contact 10 is manually depressed to release lockout spring 400 when GFCI 2 is not operational. FIG. 13 also shows how the lockout function is unaffected by whether the power supply for the GFCI comprising resistor 20, Zener 18, and capacitor 19 are coupled to the load side of armatures 32 and 34. Load side power derivation may be convenient for GFCIs or protective devices housed in a circuit breaker. FIG. 13 also shows how SCR 22 can be replaced by a transistor 22', with either device comprising a switch for controlling solenoid 24.

Figure 14:
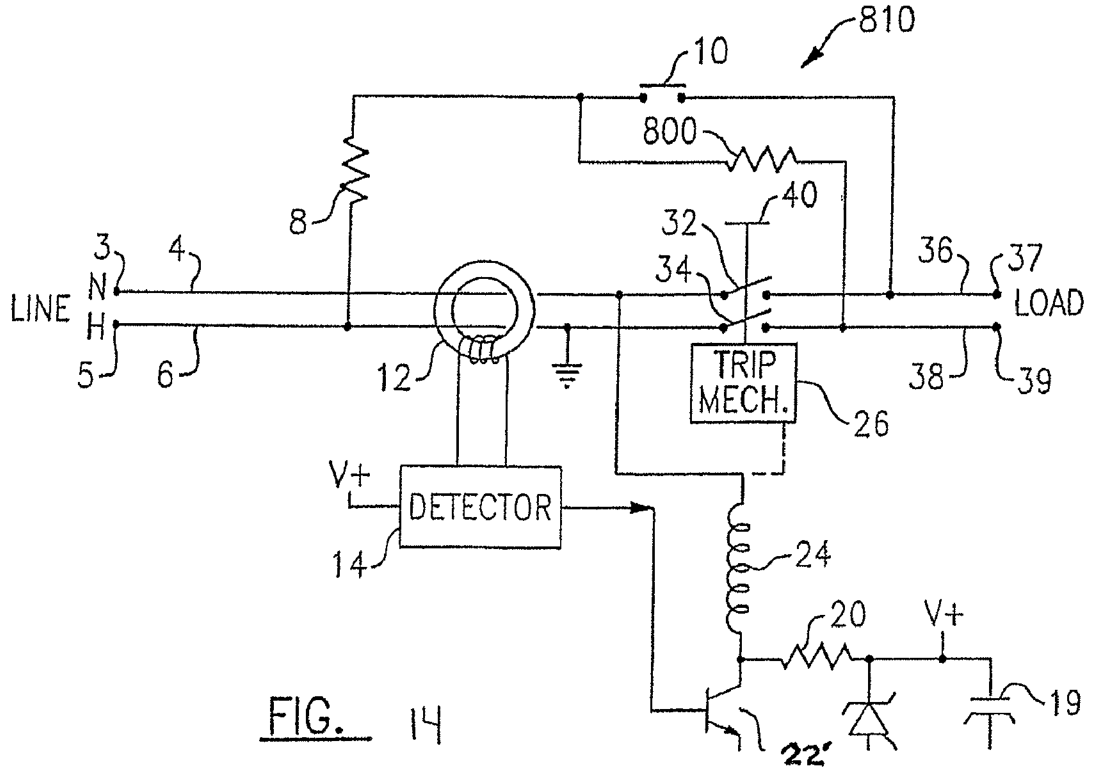
FIG. 14 is a schematic circuit diagram of another exemplary protective device.

Referring to FIG. 14, a protective device 810 that is an alternate embodiment to FIG. 13, shows a resistor 800 that serves the same function as resistor 700 in FIG. 13 but is coupled to the load side of the interrupting contacts, i.e., contact armatures 32, 34. This may be important for 6 mA GFCI receptacles and portables where the hot and neutral supply conductors are inadvertently transposed by the installer, wherein the hot side of the supply voltage from the electrical distribution system is connected to line terminal 5. If the armatures 32 and 34 in FIG. 13 are disconnected in response to a fault current, a hazardous current may yet flow through resistors 8 and 700 through ground fault 702 when contact 10 is depressed. However, if armatures 32 and 34 in FIG. 14 are disconnected, current flows through resistor 8 but not through resistor 800, which is not a problem because the current flow through resistor 8 alone has already been determined to be non-hazardous.

Figure 15:
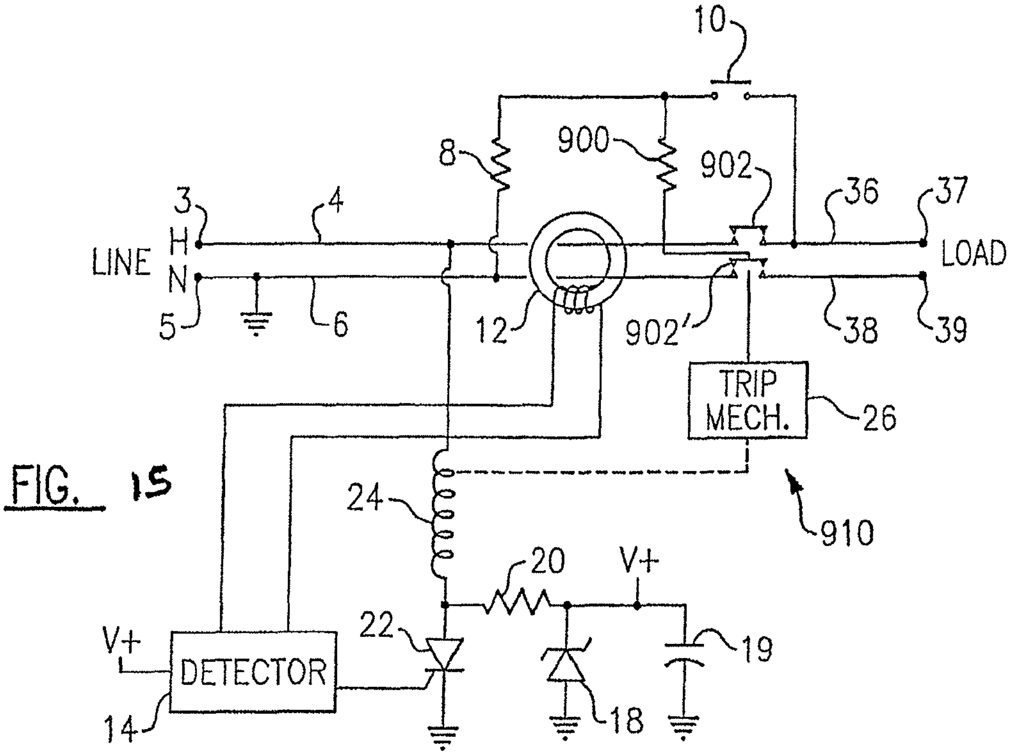
FIG. 15 is a schematic circuit diagram of another exemplary protective device.

Referring to FIG. 15, a protective device 910, which is an alternative embodiment to FIG. 14, is shown in which the trip mechanism comprises one or more bus bars. Reference is made to U.S. Pat. No. 5,510,760, which is incorporated herein by reference as though fully set forth in its entirety, for a more detailed explanation of the bus bar arrangement. Resistor 900 serves the same function as resistor 800 in FIG. 14 except that resistor 900 is coupled to moveable bus bar 902'. For receptacle housings it is possible for the installer to miswire a GFCI such that the supply voltage is connected to load terminals 37 and 39, which would cause resistor 800 (FIG. 14) to melt solder when contact 10 is depressed, even when device 810 is in good working condition, i.e., operational. The problem is alleviated in the embodiment of FIG. 15 whereby resistor 900 melts solder only when bus bar 902' remains connected when contact 10 is depressed, that is, when device 910 is non-operational. Miswiring thus does not cause a permanent lock-out of device 910.

Figure 16:
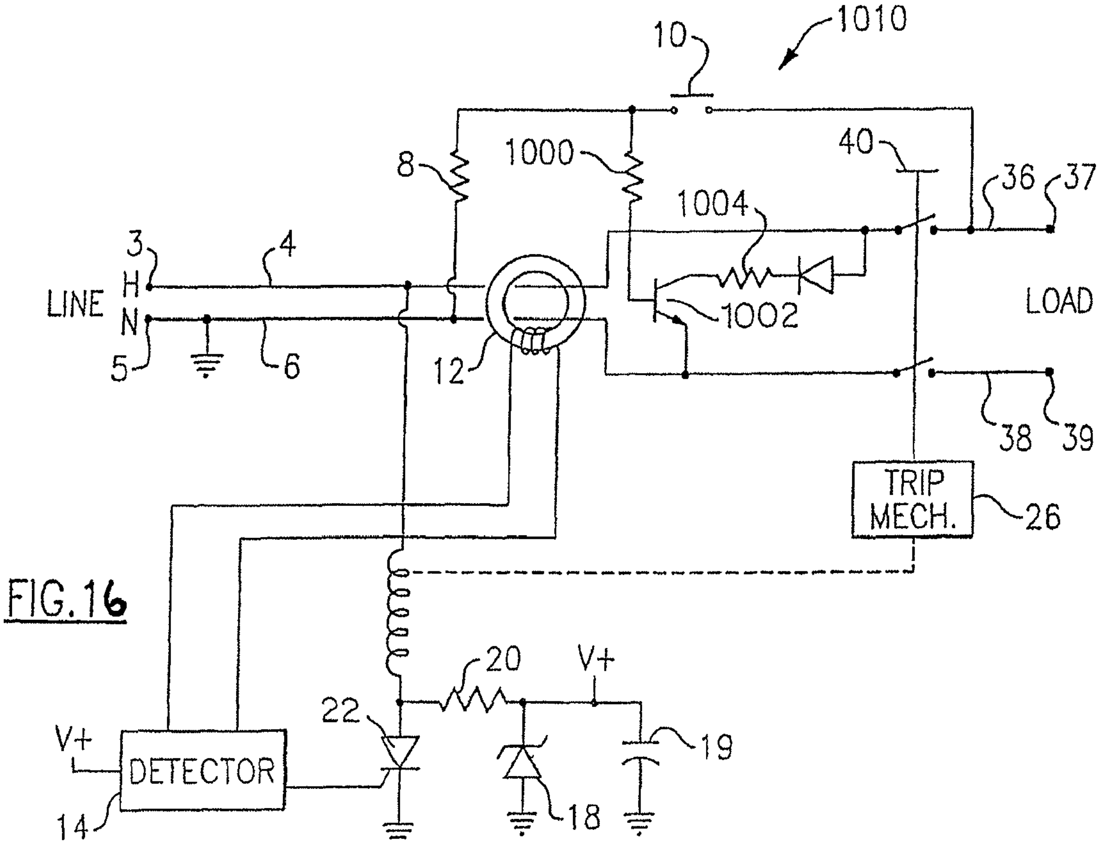
FIG. 16 is a schematic circuit diagram of another exemplary protective device.

Referring to FIG. 16, a protective device 1010 which is an alternate embodiment to FIG. 13 is shown, wherein contact 10 enables a current through resistor 8, as previously described, and a second current through a resistor 1000 in which the second current is preferably less than a tenth of the current through resistor 8. The second current depends on an interface circuit such as a transistor switch 1002. Transistor switch 1002 causes current to flow through a resistor 1004 of identical function to resistor 700 described in FIG. 13, i.e., resistor 1004 is normally in such a position as to leave spring 400 (FIG. 12) under tension, but when resistor 1004 heats up from the current through it sufficient to dislodge the solder affixing resistor 1004 to a fixed reference surface, the dislodgement of resistor 1004 releases spring 400.

FIG. 16 shows an alternative to FIG. 14 wherein a hazardous current does not occur when the hot and neutral supply conductors are inadvertently transposed as described in FIG. 14. In addition, FIG. 16 shows another remedy for the issue described in the FIG. 15 embodiment wherein resistor 1004 melts solder only if protective device 1010 is non-operational and not when protective device 1010 is miswired.

Figure 17:
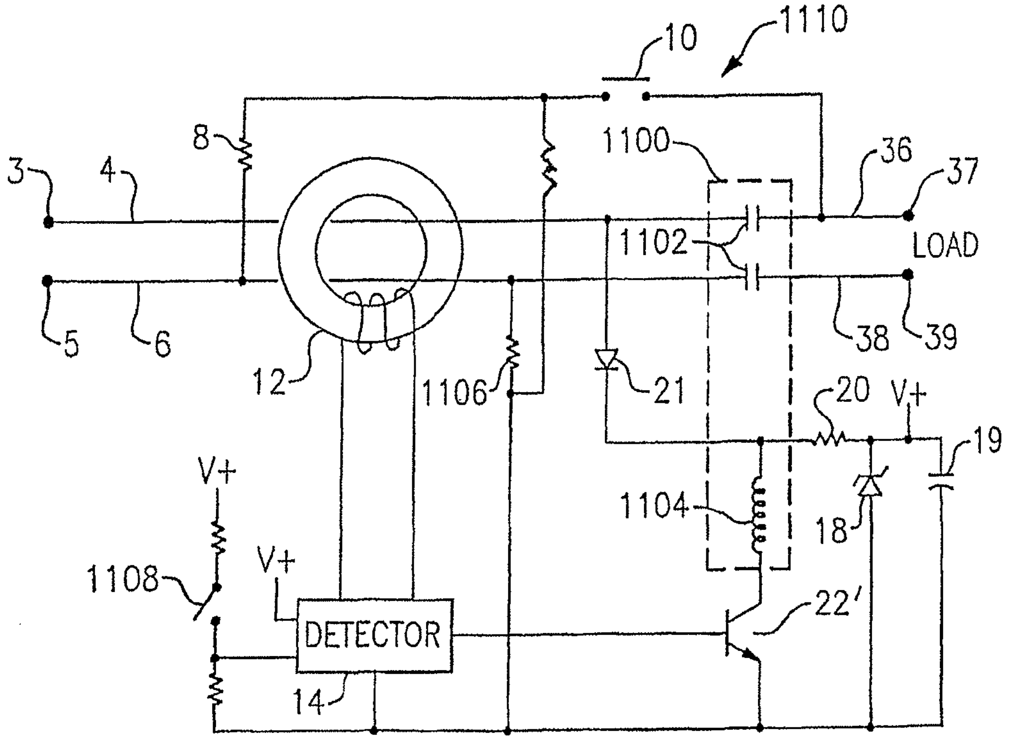
FIG. 17 is a schematic circuit diagram of another exemplary protective device.

Referring to FIG. 17, a protective device such as GFCI 1110 according to an alternate embodiment is shown, wherein the so called mouse trap mechanism, i.e., the tripping mechanism of the GFCI of FIGS. 7-11, is replaced by a relay

1100 having normally open contacts 1102 that connect or disconnect line terminals 3 and 5 from load terminals 37 and 39 respectively, and a solenoid 1104, which is designed to carry current when contacts 1102 of GFCI 1110 are connected, a construction that is common to, but not limited to, portable GFCI devices. Solenoid 1104 is designed to conduct current for the unlimited duration that GFCI 1110 is in use, wherein solenoid 1104 is not susceptible to burn out caused by over-activation as previously described with respect to solenoid 24. A fusible element 1106 is in series with the solenoid and is designed to carry the continuous current through solenoid 1104 when transistor 22' is closed. Contact 10 enables current through resistor 8, which produces a difference current as previously described, and a common mode current, which, if the device is non-operational, enables a lock-out feature. The common mode current, which is greater than the solenoid current, is conducted through fusible element 1106.

If GFCI 1110 is operational, the load side is disconnected from the line side, causing the device to trip and resistor 8 and common mode currents to stop flowing even if contact 10 continues to be manually depressed. Fusible resistor 1106 must survive several thousand cycles of common mode current exposures from alternately depressing contact 10 to trip GFCI 1110 and switch 1108 to electronically reset GFCI 1110. The duration of each common mode current exposure is the expected time that GFCI 1110 requires for tripping after contact 10 has been depressed. If GFCI 1110 fails in some manner such that the trip time in response to depressing contact 10 is greater than the expected interval including the failure of GFCI 1110 to trip altogether, fusible element 1106 burns to an open circuit, permanently eliminating current through solenoid 1104 and rendering interrupting contacts 1102 in a permanently disconnected position. Fusible element 1106 can include a resistor.

Figure 18:
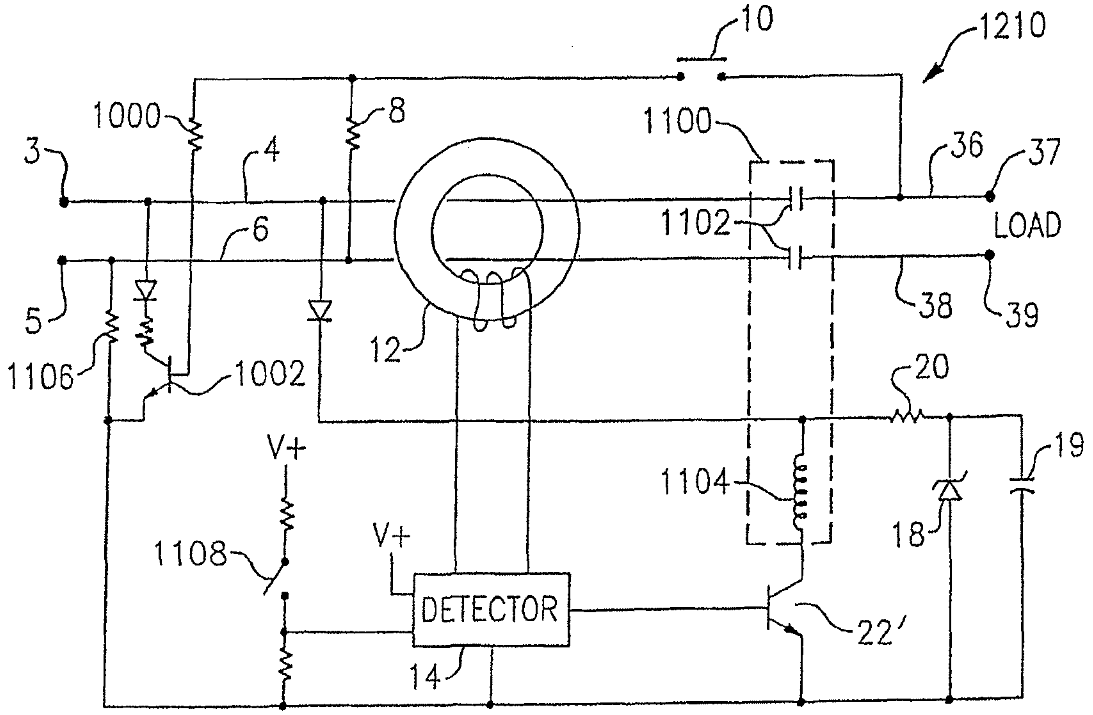
FIG. 18 is a schematic circuit diagram of another exemplary protective device.

Referring to FIG. 18, elements of the circuit diagram of FIG. 17 are combined with elements of the circuit diagram of FIG. 14 in a protective device 1210, wherein components having like functions bear like numbers. The concept shown in FIG. 17 is thus combined with the embodiment of FIG. 14 to protect against the inadvertent transposing of the hot and neutral supply conductors to terminals 3 and 5 from the electrical distribution system. For protective devices not equipped with a resistor 8, the value of resistor 1000 can be chosen so that current passing there through is less than 0.5 mA, which limit has been identified to be the perception level for humans.

Figure 19:
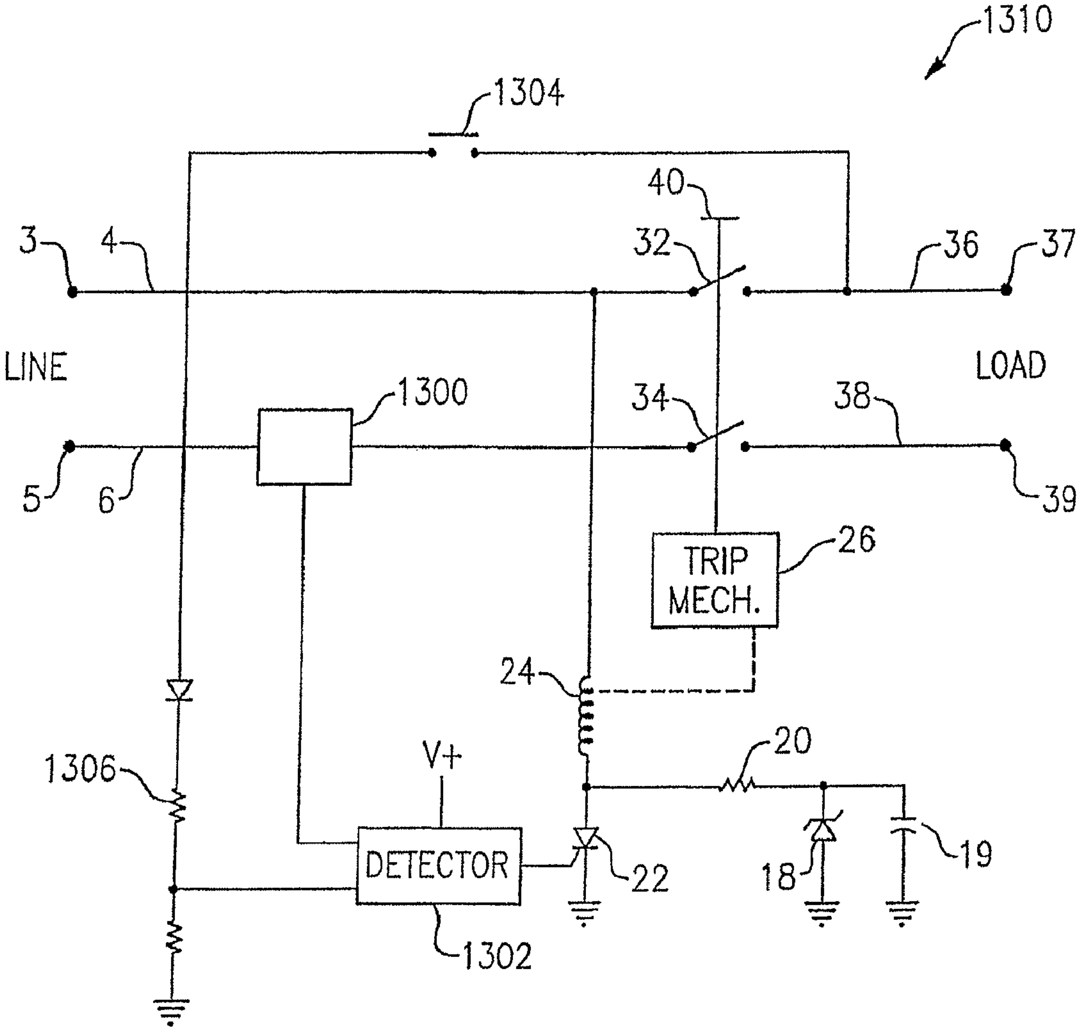
FIG. 19 is a schematic circuit diagram of another exemplary protective device.

Referring to FIG. 19, an alternate embodiment is shown in which the preceding concepts are applied to a general protective device 1310 representative of the class of general protective devices including AFCIs that require a contact 10 but that are not necessarily equipped with a GFCI or a sensor capable of sensing difference current. Reference is made to U.S. Pat. No. 6,421,214, which is incorporated herein by reference as though fully set forth in its entirety, for a more detailed explanation of protective device 1310. Components having like functions bear like numbers. Sensor 1300 is similar to sensor 12 but may be a current sensor or shunt for sensing load current through either conductor 6 or through conductor 4. A detector 1302 is similar to detector 14 (FIG. 7) but senses particular signatures in the load current as has been demonstrated in other patent applications as a method of identifying arc faults. A contact 1304 is similar to contact 10 (FIG. 7), which initiates a test of protective device 1310 when depressed. The test signal can be controlled by detector 1302 to test sensor 1300, detector 1302, switch 22, and trip mechanism 26. A resistor 1306 is similar to resistor 700 (FIG. 13), which is affixed to a fixed reference surface. If armatures 32 and 34 fail to operate due to a malfunction of protective device 1310, the longer duration of current through resistor 1306 causes sufficient self-heating of resistor 1306 to melt the solder affixing resistor 1306 to the fixed reference surface, wherein resistor 1306 is dislodged due to force exerted by lockout spring 400 (FIG. 10), wherein lockout spring 400 causes armatures 32 and 34 to be permanently disconnected.

Figure 20:
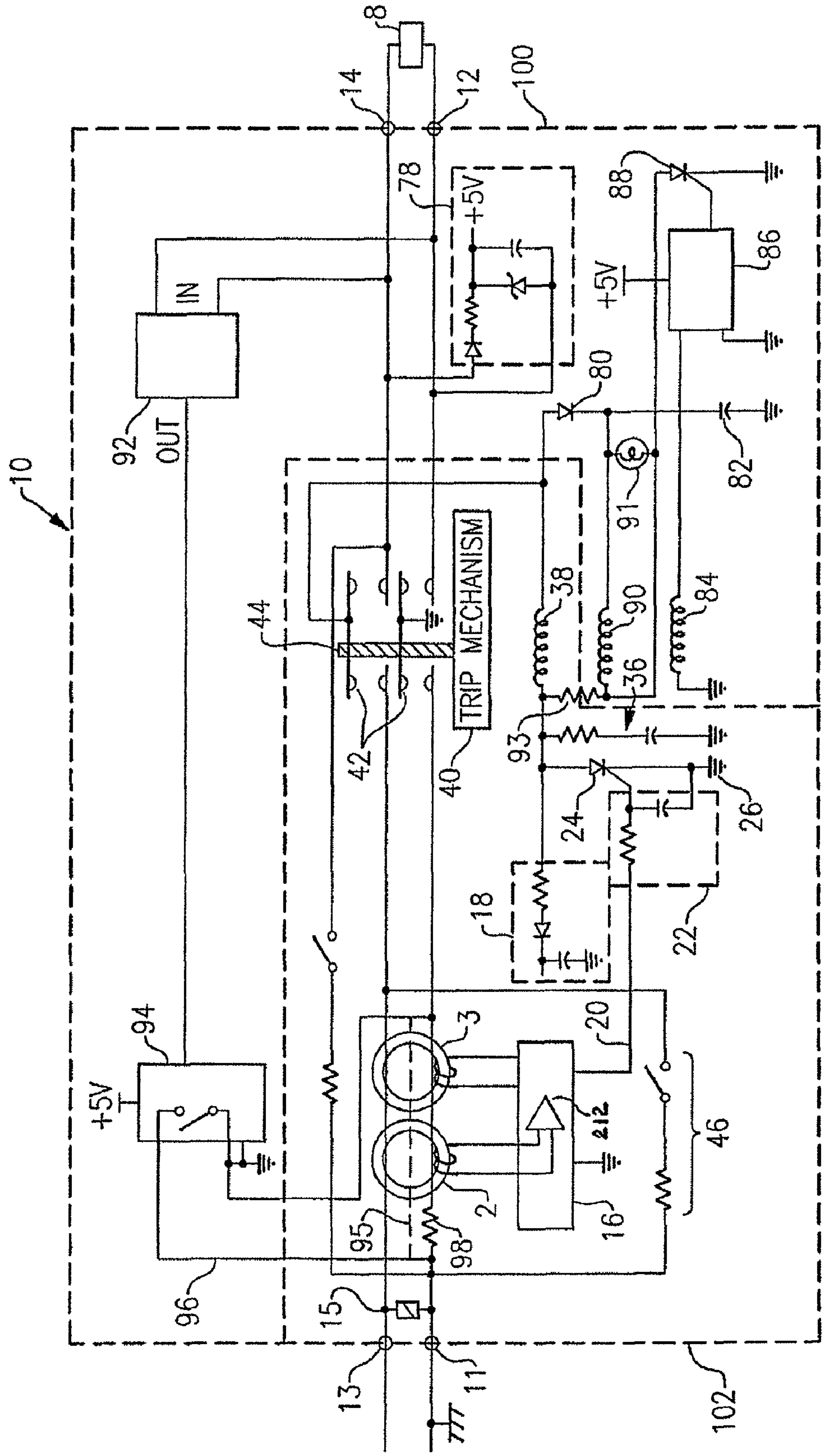
FIG. 20 is a block diagram of another exemplary circuit protection device.

Another exemplary circuit protection component is shown in FIG. 20. The block diagram of FIG. 20 is a GFCI 10 configured to introduce a simulated ground fault every period during the negative half cycle that the trip SCR cannot conduct. If the device fails to detect the simulated ground fault, i.e., the self-test fails, the device is tripped on the next positive half cycle.

As shown in FIG. 20, GFCI 10 protects an electrical circuit that provides electrical power to load 8. GFCI 10 is connected to the AC power source by way of line-side neutral terminal 11 and line-side hot terminal 13. GFCI 10 is coupled to load 8 by way of load side neutral terminal 12 and load-side hot terminal 14. GFCI 10 includes two main parts, Ground Fault Interrupt (GFI) circuit 102 and checking circuit 100.

GFI circuit 102 includes a differential sensor 2 that is configured to sense a load-side ground fault when there is a difference in Current between the hot and neutral conductors. Differential sensor 2 is connected to detector circuit 16, which processes the output of differential sensor 2. Detector 16 is connected to power supply circuit 18. Power supply 18 provides power for allowing detector 16 to detect a ground fault during both the positive half-cycle and the negative half cycle of the AC power. As such, detector circuit 16 provides all output signal on output line 20. The output line 20 is coupled to SCR 24 by way of filter circuit 22. When detector circuit 16 senses a fault, the voltage signal on output line 20 changes and SCR 24 is turned ON. SCR 24 is only able to turn ON during the positive half cycles of the AC power signal. Further, snubber network 36 prevents SCR 24 from turning on due to spurious transient noise in the electrical circuit. When SCR 24 is turned ON, solenoid 38 is activated. Solenoid 38, in turn, causes the trip mechanism 40 to release the interrupter contacts 42. When interrupter contacts 42 are released, the load-side of GFCI 10 is decoupled from the line-side power source of the electrical circuit. GFI circuit 102 also includes a grounded neutral transmitter 3 that is configured to detect grounded neutral conditions. Those skilled in the art understand that the conductor connected to neutral terminal 11 is deliberately grounded in the electrical circuit. On the other hand, a grounded neutral condition occurs when a conductor connected to load neutral terminal 12 is accidentally grounded. The grounded neutral condition creates a parallel conductive path with the return path disposed between load terminal 12 and line terminal 11. When a grounded neutral condition is not present, grounded neutral transmitter 3 is configured to couple equal signals into the hot and neutral conductors. As noted above, differential sensor 2 senses a current differential. Thus, the equal signals provided by grounded neutral transmitter 3 are ignored. However, when a grounded neutral condition is present, the signal coupled onto the neutral conductor circulates as a current around the parallel conductive path and the return path, forming a conductive loop. Since the circulating current conducts through the neutral conductor but not the hot conductor, a differential current is generated. Differential sensor 2 detects the differential current between the hot and neutral conductors. As such, detector 16 produces a signal on output 20 in response to the grounded neutral condition.

Interrupter contacts 42 are coupled to trip mechanism 40. Interrupter contacts 42 are configured to selectively couple and decouple the load-side terminals (12, 14) from the corresponding line-side terminals (11, 13). In one embodiment, trip mechanism 40 is arranged in what is known in the art as a mouse trap arrangement. Interrupter contacts 42 include spring loaded contacts. When the trip mechanism 40 is activated, the spring-loaded contacts 42 are opened and latched in an open condition. Interrupter contacts 42 are manually reset (closed) by depressing reset button 44.

In another embodiment, trip mechanism 40 and circuit interrupter 42 may be configured as a relay in which the contacts are normally open. In this alternative construction, when the trip mechanism 40 is de-activated, the contacts are biased open until such time as trip mechanism 40 is re-activated. As noted previously, GFCI 10 is configured to detect both ground faults and grounded neutral conditions.

As noted initially, GFCI 10 includes a checking circuit 100. Checking circuit 100 causes GFI 102 to trip due an internal fault also known as an end of life condition. Examples of an end of life condition include, but are not limited to, a non-functional sensor 2, grounded neutral transmitter 3, ground fault detector 16, filtering circuit 22, SCR 24, snubber 36, solenoid 38, or power supply 18. An internal fault may include a shorting or opening of an electrical component, or an opening or shorting of electrical traces configured to electrically interconnect the components, or other such fault conditions wherein GFI 102 does not trip when a grounded neutral fault occurs.

Referring to FIG. 20, checking circuit 100 includes several functional groups. The components of each group are in parenthesis. These functions include a fault simulation function (92,94,96), a power supply function 78, a test signal function (38, 80, 82, 84), a failure detection function (86), and failure response function (88,90,91).

Fault simulation is provided by polarity detector 92, switch 94, and test loop 96. Polarity detector 92 is configured to detect the polarity of the AC power signal, and provide an output signal that closes switch 94 during the negative half cycle portions of the AC power signal, when SCR 24 cannot turn on. Test loop 96 is coupled to grounded neutral transmitter 3 and ground fault detector 2 when switch 94 is closed. Loop 96 has less than 2 Ohms of resistance. Because polarity detector 92 is only closed during the negative half cycle, electrical loop 96 provides a simulated grounded neutral condition only during the negative half cycle. However, the simulated grounded neutral condition causes detector 16 to generate a fault detect output signal on line 20.

The test signal function provides an oscillating ringing signal that is generated when there is no internal fault condition. Capacitor 82 and solenoid 38 form a resonant circuit. Capacitor 82 is charged through a diode 80 connected to the AC power source of the electrical circuit. SCR 24 turns on momentarily to discharge capacitor 82 in series with solenoid 38. Since the discharge event is during the negative half cycle, SCR 24 immediately turns off after capacitor 82 has been discharged. The magnitude of the discharge current and the duration of the discharge event are insufficient for actuating trip mechanism 40, and thus interrupting contacts 42 remain closed. When SCR 24 discharges capacitor 40 during the negative AC power cycle, a field is built up around solenoid 38 which, when collapsing, causes a recharge of capacitor 82 in the opposite direction, thereby producing a negative voltage across the capacitor when referenced to circuit common. The transfer of energy between the solenoid 38 and capacitor 82 produces a test acceptance signal as a ringing oscillation. Winding 84 is magnetically coupled to solenoid 38 and serves as an isolation transformer. The test acceptance signal is magnetically coupled to winding 84 and is provided to reset delay timer 86.

The failure detection function is provided by delay timer 86 and SCR 88. Delay timer 86 receives power from power supply 78. When no fault condition is present, delay timer 86 is reset by the test acceptance signal during each negative half cycle preventing timer 86 from timing out. If there is an internal fault in GFI 102, as previously described, the output signal on line 20 and associated test acceptance signal from winding 84 which normally recurs on each negative half cycle ceases, allowing delay timer 86 to time out.

SCR 88 is turned on in response to a time out condition. SCR 88 activates solenoid 90, which in turn operates the trip mechanism 40. Subsequently, interrupter contacts 42 are released and the load-side terminals (12, 14) are decoupled from the power source 0 f the electrical circuit. If a user attempts to reset the interrupting contacts by manually depressing the reset button 44, the absence of test acceptance signal causes GFI 10 to trip out again. The internal fault condition can cause GFI 10 to trip, and can also be indicated visually or audibly using indicator 91. Alternatively, solenoid 90 can be omitted, such that the internal fault condition is indicated visually or audibly using indicator 91, but does not cause GFI 10 to trip. Thus the response mechanism in accordance with the present invention can be a circuit interruption by circuit interrupter 40, an indication by indicator 90, or both in combination with each other. GFI 10 includes a light source 108. GFI 10 may include an indicator 91 viewable through front housing **104*a* in a similar manner as trip indicator 502 as depicted in FIG. 5. Indicator 91 may be "on continuously" in an "on" state or may "blink" in an "on" state when GFI 10 (or protective device 1310) has reached an end of life condition. In particular, indicator 91 may be a blinking red indicator. The trip indicator need not be a light source, but rather could be an audible signal that emits a steady sound or a beeping sound, or could be an indicating flag. In another aspect, GFI 10 (or protective device 1310) includes a light source 108, trip indicator 502, and internal fault (end of life) indicator 91. In another aspect, indicator 91 and trip indicator 502 are combined into a single visual indicator. In another aspect, indicator 91 and light source 108 are combined in a single visual indicator. For those aspects in which a single indicator is employed, the various types of indication are distinguished by different colors, blinking patterns, or the like. Checking circuit 100 is also susceptible to end of life failure conditions. Checking circuit 100 is configured such that those conditions either result in tripping of GFI 102, including each time reset button 44 is depressed, or at least such that the failure does not interfere with the continuing ability of GFI 102 to sense, detect, and interrupt a true ground fault or grounded neutral condition. For example, if SCR 88 develops a short circuit, solenoid 90 is activated each time GFI 102 is reset and GFI 102 immediately trips out. If one or more of capacitor 82, solenoid 90 or winding 84 malfunction, an acceptable test signal will not be generated, and checking circuit 100 will cause GFI 102 to trip out. If polarity detector 92 or switch 94 are shorted out, the grounded neutral simulation signal is enabled during both polarities of the AC power source. This will cause GFI 102 to trip out. If polarity detector 92 or switch 94 open circuit, there is absence of grounded neutral simulation signal, and delay timer 86 will not be reset and GFI 102 will trip out. Solenoids 38 and 90 are configured to operate trip mechanism 40 even if one or the other has failed due to an end of life condition. Therefore if solenoid 90 shorts out, trip mechanism 40 is still actuatable by solenoid 38 during a true fault condition. If power supply 78 shorts out, power supply 18 still remains operational, such that GFI 102** remains operative.

Although much less likely to occur, some double fault conditions cause GFI 102 to immediately trip out. By way of illustration, if SCR 88 and SCR 24 simultaneously short out, solenoids 38 and 90 are both turned on, resulting in activation of trip mechanism 40.

In another embodiment, solenoid 90 can be omitted and SCR 88 reconnected as illustrated by dotted line 93. During a true fault condition, solenoid 38 is turned on by SCR 24. When an end of life condition in GFI 102 is detected by checking circuit 100, solenoid 38 is turned on by SCR 88. The possibility of a solenoid 38 failure is substantially minimized by connecting solenoid 38 to the load side of interrupting contacts 42.

As has been described, wire loop 96 includes a portion of the neutral conductor. A segment of the hot conductor can be included in electrical loop 96 instead of the neutral conductor to produce a similar simulation signal (not shown.) Other modifications may be made as well. The neutral conductor (or hot) conductor portion has a resistance 98, typically 1 to 10 milliohms, through which current through load 8 flows, producing a voltage drop. The voltage drop causes a current in electrical loop 96 to circulate which is sensed by differential sensor 2 as a ground fault. Consequently, ground fault detector 16 produces a signal on output 20 due to closure of test switch 94 irrespective of whether or not an internal fault has occurred in neutral transmitter 3. In order to assure that grounded neutral transmitter 3 is tested for a fault by checking circuit 100, electrical loop 96 can be configured as before but not to include a segment of the neutral (or hot) conductor, as illustrated by the wire segment, shown as dotted line 95.

Figure 21:
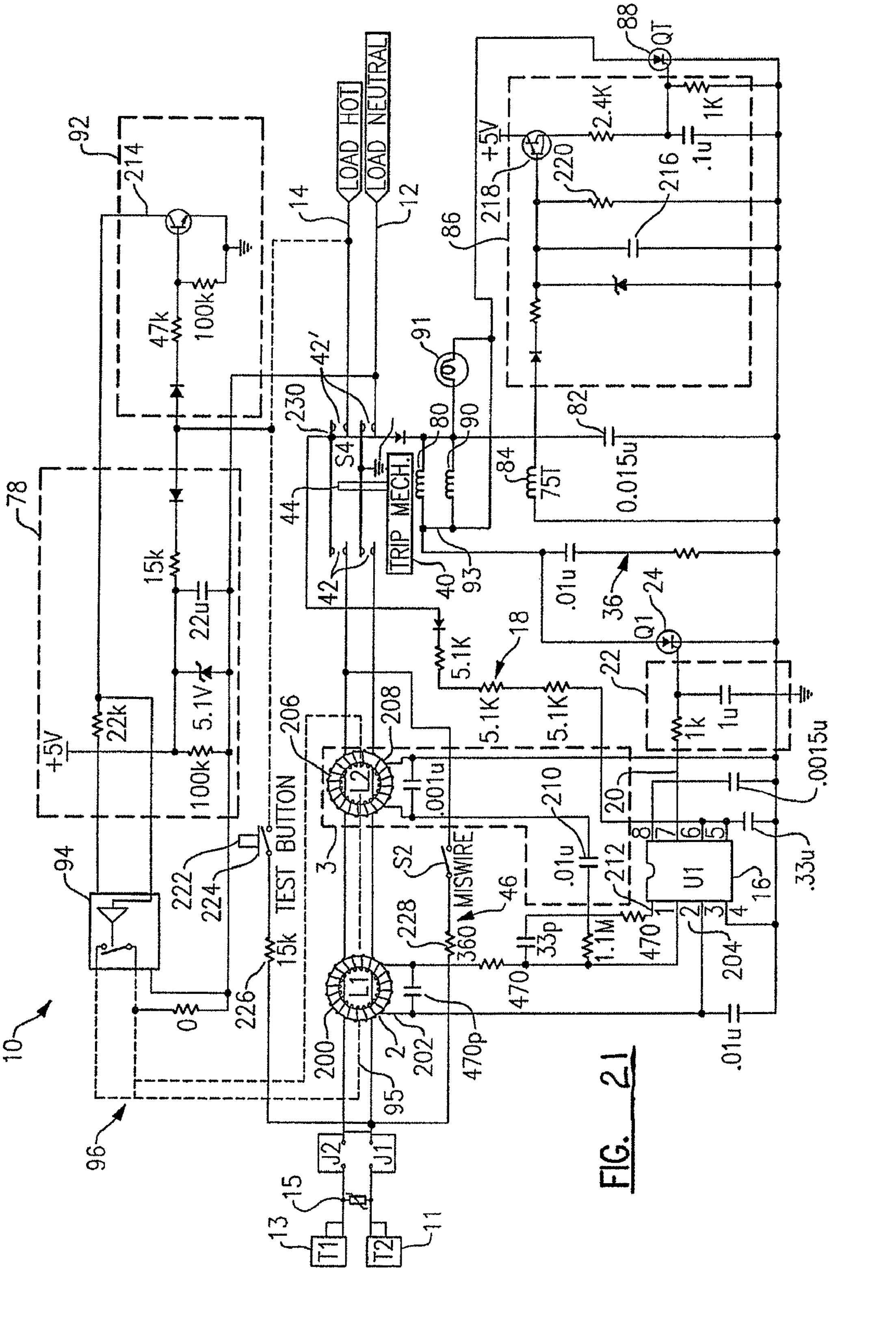
FIG. 21 is a circuit schematic of the diagram depicted in FIG. 20.

As depicted in FIG. 21, a circuit schematic of the diagram depicted in FIG. 20 is shown. In FIG. 21, ground fault detector 16 is an RV 4141 integrated circuit manufactured by Fairchild Semiconductor. Ground fault detector 2 is implemented as a toroidally shaped magnetic core 200 about which a winding 202 is wound. Winding 202, typically having 1,000 turns, is coupled to an input terminal 204 of ground fault detector 16. Grounded neutral transmitter 3 is implemented as a second toroidally shaped magnetic core 206 about which a winding 208 is wound. Winding 208, typically having 200 turns, is coupled in series with a capacitor 210 to the gain output terminal 212 of ground fault detector 16. Hot and neutral conductors 13 and 11, and wire segment 95 if used, pass through the apertures of cores 200 and 206.

During either a true grounded neutral condition, or during a simulated grounded neutral condition, low level electrical noise indigenous to the electrical circuit or to ground fault detector 16 creates a magnetic flux in either core 200 or 206, or both, flux in core 206 having been induced by winding 208. Core 206 induces a circulating current in electrical loop 96, which induces a flux in core 200. The resulting signal from winding 202 is amplified by the gain of ground fault detector 16 to produce an even greater flux in core 206 via winding 208. Through the regenerative feedback action as has been described, ground fault detector 16 breaks into oscillation, typically 5 to 10 kHz. The oscillation produces a signal on output 20 during a grounded neutral fault or simulated grounded condition as has been previously described.

As shown in FIG. 21, switch 94 may be implemented as an analog switch, such as USW 1 MAX 4626, manufactured by Maxim Semiconductor. Polarity detector 92 may be implemented using transistor 214, which closes switch 94 during the negative half cycle portions of the AC power supply of the electrical distribution system.

Delay timer 86 includes a capacitor 216, which is configured to hold a pre-established voltage when test acceptance signals are properly received. The pre-established voltage prevents transistor 218 from turning SCR 88 ON. An end of life condition is signaled by the cessation of the test acceptance signal. In the absence of the test acceptance signal, the voltage on capacitor 216 decays below the pre-established voltage within a pre-established time interval, the rate of decay being established by bleeder 220. In response, transistor 218 actuates SCR 88 and GFI 102 is tripped. The pre-established time interval is chosen such that checking circuit 100 is not responsive to normal transient conditions that may exist in the electrical circuit, such as momentary or intermittent loss of AC power supply voltage or momentary voltage transients, but responsive solely to end of life conditions.

GFCI 10 may be equipped with a manually accessible test button 222 for closing switch contacts 224 for initiating a simulated grounded hot fault signal, or alternatively, a simulated grounded neutral fault signal. If GFI 10 is operational, closure of switch contacts 224 initiates a tripping action. The purpose of the test button feature may be to allow the user to control GFCI 10 as a switch for applying or removing power from load 8, in which case test button 22 and reset button 44 have been labeled “off” and “on” respectively. Usage of test button 222 does not affect the performance of checking circuit 100, or vice-versa.

GFCI 10 may also be equipped with a miswiring detection feature such as miswire network 46. Reference is made to U.S. Pat. No. 6,522,510, which is incorporated herein by reference as though fully set forth in its entirety, for a more detailed explanation of miswire network 46. Briefly stated, miswire network 46 is configured to produce a simulated ground fault condition. During the installation of GFCI 10 if the power source voltage is coupled to the line terminals 11 and 13 as intended, the current through network 46 causes GFI 102 to trip but the current through network 46 continues to flow, until such time as network 46 open circuits due to heating of a fusible component included in network 46. The fusible component may be implemented by resistor 228, configured to fuse in typically 1 to 10 seconds. When the fusible component opens, the GFCI is able to be reset. Subsequently, GFI 102 and checking circuit 100 operate in the previously described manner. However, if the power source is connected to the load terminals, i.e., if GFCI 10 is miswired during installation, GFI 102 trips as before, but interrupting contacts 42 immediately terminate the current flow through network 46, typically in less than 0.1 seconds. This time period is too brief an interval to cause the fusible component to fail. Thus, when GFCI 10 is miswired the fusible element in network 46 remains intact, and reset button 44 cannot effect a resetting action. GFCI 10 cannot be reset regardless of signals to or from checking circuit 100.

If GFCI 10 is properly wired and tested during an installation, miswire network 46 will fuse open and not be available to afford miswire protection if GFCI 10 happens to be re-installed. However, the checking circuit 100 can be configured to extend miswire protection to the re-installation. During the course of re-installation, the user depresses test button 222 to close contacts 224. If GFCI 10 has been miswired, power supply 78 is connected to the load side of interrupting contacts 42 and delay timer 86 receives power. Power supply 18 is connected to a bus bar 230 between interrupting contacts 42 and 42'. Since interrupting contacts 42' are open, ground fault detector 16 does not receive power, and test acceptance signal is not communicated by winding 84 to charge capacitor 216 to a voltage greater than the pre-determined threshold. As a result, transistor 218 turns SCR 88 ON, and solenoid 90 activates trip mechanism 40. Whenever the reset button is depressed, the trip mechanism is activated such that the interrupter contacts do not remain closed. Thus, the checking circuit 100 interprets miswiring as it would an end-of-life condition. Thereafter, GFCI 10 can only be reset when it is re-installed and wired properly.

Figure 22:
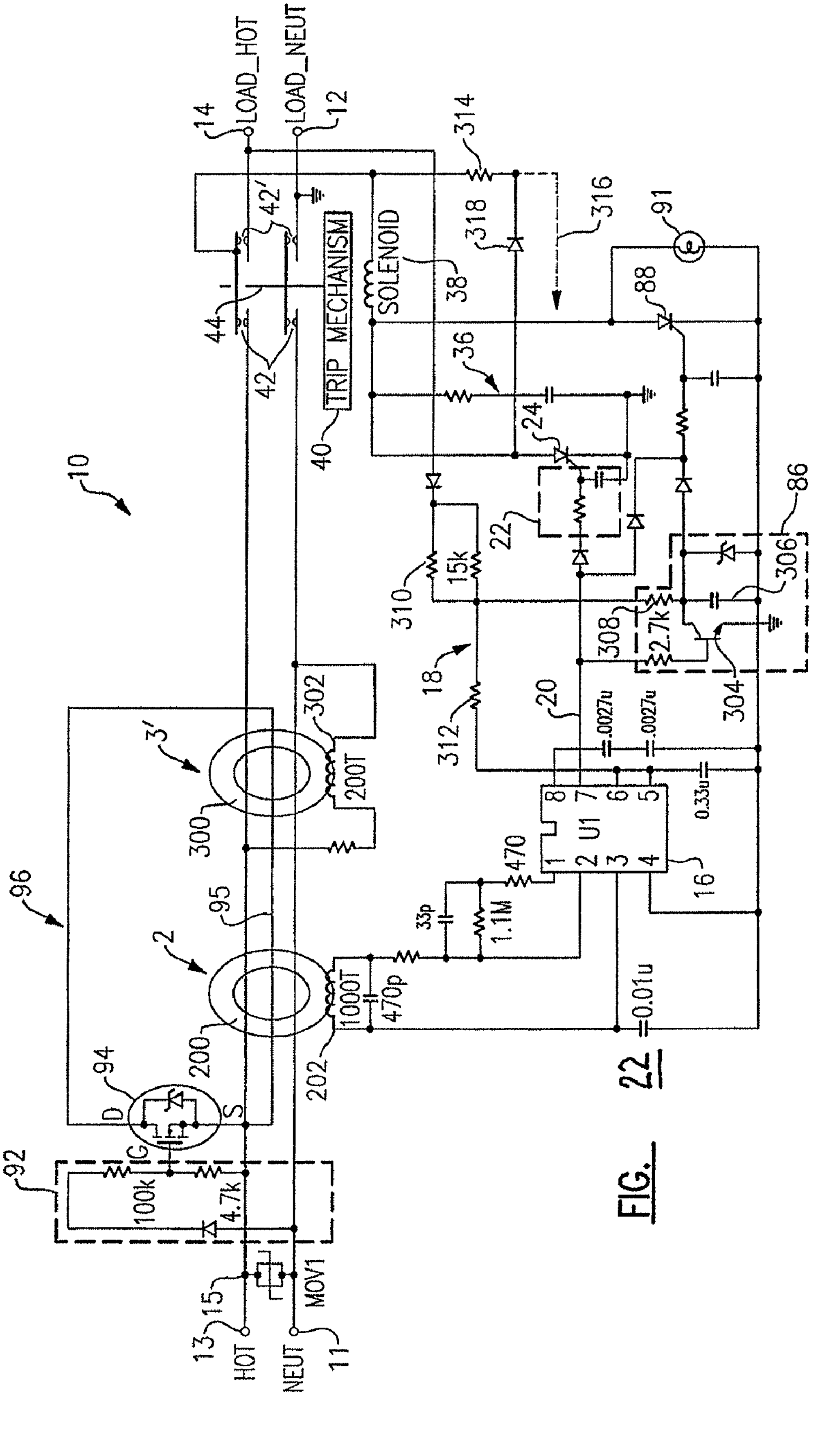
FIG. 22 is another circuit schematic of the diagram depicted in FIG. 20.

A circuit schematic of the diagram depicted in FIG. 20 is shown in FIG. 22. Grounded neutral transmitter 3' includes a saturating core 300 and a winding 302 coupled to hot and neutral terminals 13 and 11. During a true grounded neutral fault condition, saturating core 300 induces current spikes in the electrical loop 96. Reversals in the magnetic field in core 300 correspond to the zero crossings in the AC power source. The reversals in the magnetic field generate current spikes. Current spikes occurring during the positive-transitioning zero crosses produce a signal during the positive half cycle portions of the AC power source. The signal is sensed as a differential signal by ground fault sensor 2, and detected by ground fault detector 16. Subsequently, GFI 102 is tripped. A simulated grounded neutral condition is enabled by polarity detector 92 and switch 94. Polarity detector 92 closes switch 94 during the negative half cycle. Thus, the current spikes occur during the negative half cycle portions but not during the positive half cycle portions of the AC power source. As described above, the output of detector 16 (line 20) during the negative half cycle portions of the AC power source are unable to turn on SCR 24. However, the output signal is used by checking circuit 100 to determine whether or not an end of life condition has occurred.

In yet another embodiment (not shown), the grounded neutral transmitter winding 208 can be connected to a local oscillator that provides a continuous oscillatory output signal regardless of the presence or absence of electrical loop 96.

The frequency from the oscillator is typically 5 to 10 kHz. The oscillator induces a flux in core 206 via winding 208. The true grounded neutral fault couples the flux in core 206 into differential sensor 2, causing GFI 102 to trip as described above. The simulated grounded neutral condition, enabled by closure of switch 94 during the negative half cycle portions of the AC power source, provides for an end of life test signal, whose absence is interpreted by checking circuit 100 as an end of life condition.

It will be apparent to those of ordinary skill in the pertinent art that modifications and variations can be made to switch 94, but there is shown by way of example a MOSFET device, designated as MPF930 and manufactured by ON Semiconductor Phoenix, Ariz.). In another embodiment, switch 94 may be monolithically integrated in the ground fault detector 16.

In response to a true ground fault or grounded neutral condition, ground fault detector 16 produces an output signal 20 during the positive half cycle portions of AC power source. The signal turns on SCR 24 and redundant SCR 88 to activate solenoid 38. Solenoid 38 causes trip mechanism 40 to operate.

When a simulated grounded neutral condition is introduced in the manner described above, a test acceptance signal is provided to delay timer 86 during the negative half cycle portions of the AC power source. Delay timer 86 includes a transistor 304 that discharges capacitor 306 when the test acceptance signal is received. Capacitor 306 is recharged by power supply 18 by way of resistor 308 during the remaining portion of the AC line cycle. Again, if there is an internal failure in GFCI 10, the test acceptance signal is not generated and transistor 304 is not turned on. As a result, capacitor 306 continues to charge until it reaches a predetermined voltage. At the predetermined voltage SCR 88 is activated during a positive half cycle portion of the AC power source signal. In response, solenoid 38 causes the trip mechanism 40 to operate. Alternatively, SCR 88 can be connected to a second solenoid 90 in the manner described in FIG. 20. Because FIG. 21 is a circuit schematic of the diagram depicted in FIG. 20, the indicator circuit that includes indicator 91 has substantially the same or similar functionality.

In the exemplary circuit depicted in FIG. 22, both GFI 102 and checking circuit 100 derive power from power supply 18. Redundant components can be added such that if one component has reached end of life, another component maintains the operability of GFI 102, thereby enhancing reliability, or at least assuring the continuing operation of the checking circuit 100. For example, the series pass element 310 in power supply 18 can include parallel resistors. Resistor 312 can be included to prevent the supply voltage from collapsing in the event the ground fault detector 16 shorts out. Clearly, if the supply voltage collapses, delay timer 86 maybe prevented from signaling an end of life condition. Those of ordinary skill in the art will recognize that there are a number of redundant components that can be included in GFCI 10, the present invention should not be construed as being limited to the foregoing example.

Alternatively, SCR 88 may be connected to an end of life resistor 314 as shown by dotted line 316, instead of being connected to solenoid 38 or 90. When SCR 88 conducts, the value of resistor 314 is selected to generate an amount of heat in excess of the melting point of solder on its solder pads, or the melting point of a proximate adhesive. The value of resistor 314 is typically 1,000 ohms. Resistor 314 functions as part of a thermally releasable mechanical barrier. When the solder pads are melted, resistor 314 is dislodged causing the barrier to move, and trip mechanism 40 to operate. The actuation of the barrier causes interrupting contacts 42 and/or 42' to be permanently open. In other words, depressing reset button 44 will not close interrupting contacts (42,42'). Reference is made to U.S. Pat. No. 6,621,388, which is incorporated herein by reference as though fully set forth in its entirety, for a more detailed explanation of resistor 314. Since end of life resistor 314 affords a permanent decoupling of the load side of GFCI 10 from the AC power source, it is important that the end of life resistor 314 only dislodge when there is a true end of life condition and not due to other circumstances, such as transient electrical noise. For example, SCR 88 may experience self turn-on in response to a transient noise event. Coupling diode 318 may be included to decouple resistor 314 in the event of a false end of life condition. Coupling diode 318 causes SCR 88 to activate solenoid 38 when it is ON. Note that when the interrupting contacts are in the reset state, a circuit path is formed between the upper bus bar, through the solenoid 38 and indicator 91, such that indicator 91 functions as a reset indicator. As noted above with respect to the earlier embodiments, indicator 91 may be implemented as part of the indicator elements 108 (FIG. 2) or as part of indicator 502 (FIG. 5).

Referring to FIGS. 23*a*-23*g*, timing diagrams illustrating the operation of the circuits depicted in FIG. 21 and FIG. 22 are shown. FIGS. 23*a* through 23*e* pertain to the embodiment shown in FIG. 21. Referring to FIG. 23*a*, the AC power source signal is shown, having positive half cycles 400 and negative half cycles 402. Referring to detector 16 in FIG. 21, FIG. 23*b* represents the waveform at gain output terminal 212. Voltage signal 404 is the quiescent level when there is no grounded neutral condition, whether a simulated fault condition or true fault condition. The quiescent voltage level 404 is centered between pre-established voltage thresholds 406 and 406'. The threshold levels are established by ground fault detector 16.

During each negative half cycle 402, switch 94 is closed to initiate the simulated grounded neutral signal resulting in the on-set of oscillation signal 408.

The amplitude of the oscillation 410 may decay in relationship to the instantaneous voltage of power supply 18. FIG. 23*c* shows the output voltage signal 412 present on detector output line 20. The duration of each output signal 412 corresponds to the interval in which the voltage at gain output terminal 212 is either greater than threshold 406, or less than threshold 406'. Output signal 412 is detected by delay timer 86 as the above described test acceptance signal.

FIG. 23*d* represents a true grounded neutral condition that occurs in combination with the simulated grounded neutral condition. Those of ordinary skill in the art will recognize that the present invention functions equally well during a true ground fault or true arc fault condition. Referring back to FIG. 23*d*, an oscillation signal 416 is present during at least one positive half cycle 400 as a result of the fault condition. FIG. 23*e* is a representation of the voltage signal 418 at the output of filter 22. There are two things that are of note. First, voltage signal 418 occurs during the positive half cycle 400. Second, once voltage 418 is greater than voltage threshold 414, SCR 24 is turned ON, and GFI 102 is tripped out.

Figure 23:
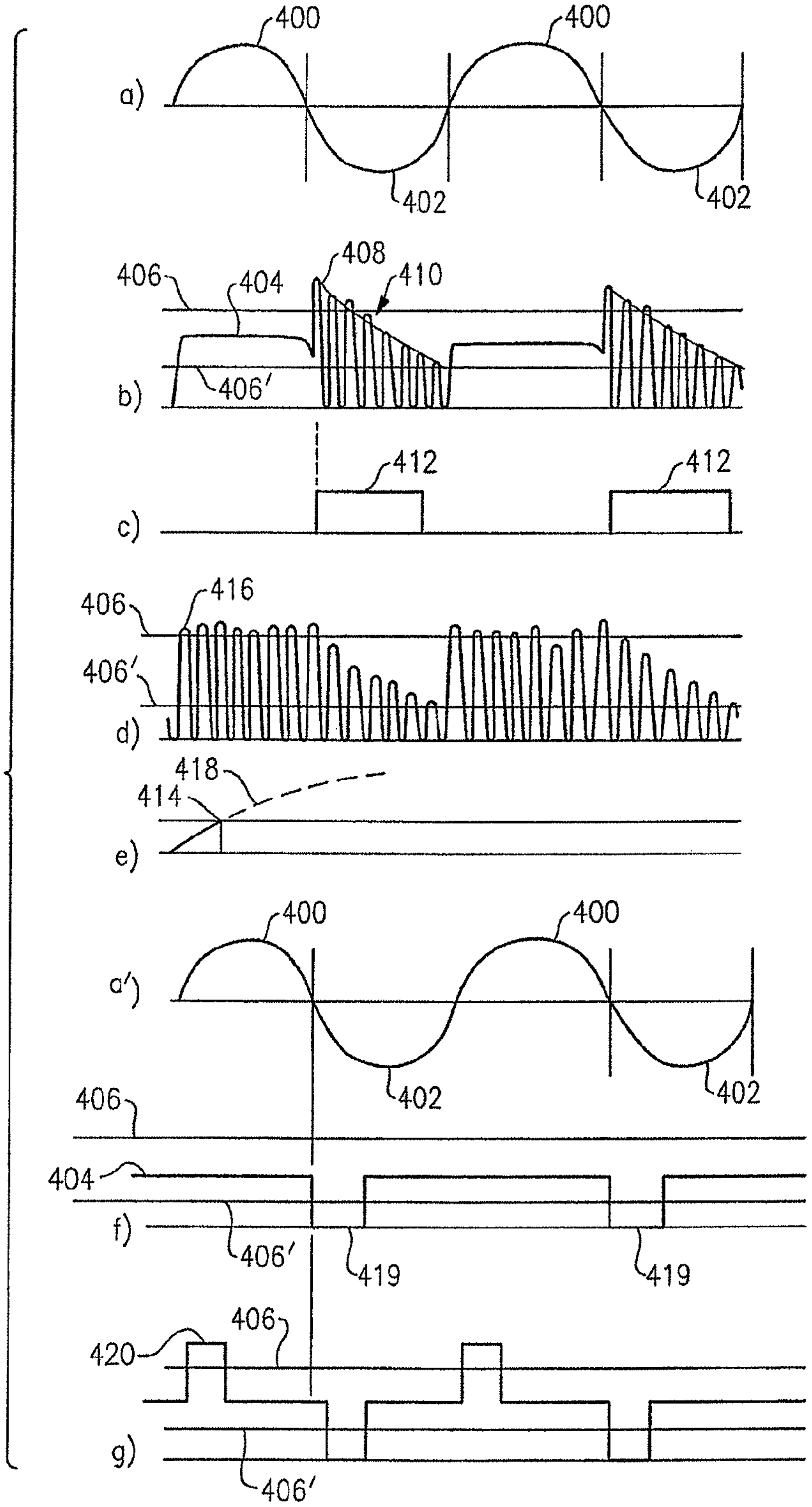
FIGS. 23*a*-23*g* include timing diagrams illustrating the operation of the circuits depicted in FIG. 21 and FIG. 22.

FIGS. 23*a'*, 23*f* and 23*g* pertain to the embodiment of FIG. 22. As described above, the embodiment of FIG. 22 employs saturating neutral core 3'. FIG. 23*a'* is identical to FIG. 23*a* and repeated for the reader's convenience. FIG. 23*f* shows voltage signal 404 at the gain output terminal 212 during a simulated grounded neutral condition. Negative-tending impulses 419 corresponds to each negative half cycle of the AC power source 402. The impulses shown in FIGS. 23*f* and 23*g* compared to the oscillation signals shown in FIGS. 23*b* and 23*d* produce similar results. During a true grounded neutral condition, there is additionally at least one positive-tending impulse 420 during a positive half cycle 400 of the AC power source. The results shown in FIG. 23 are equally applicable to a true ground fault condition or a true arc fault condition.

Figure 24:
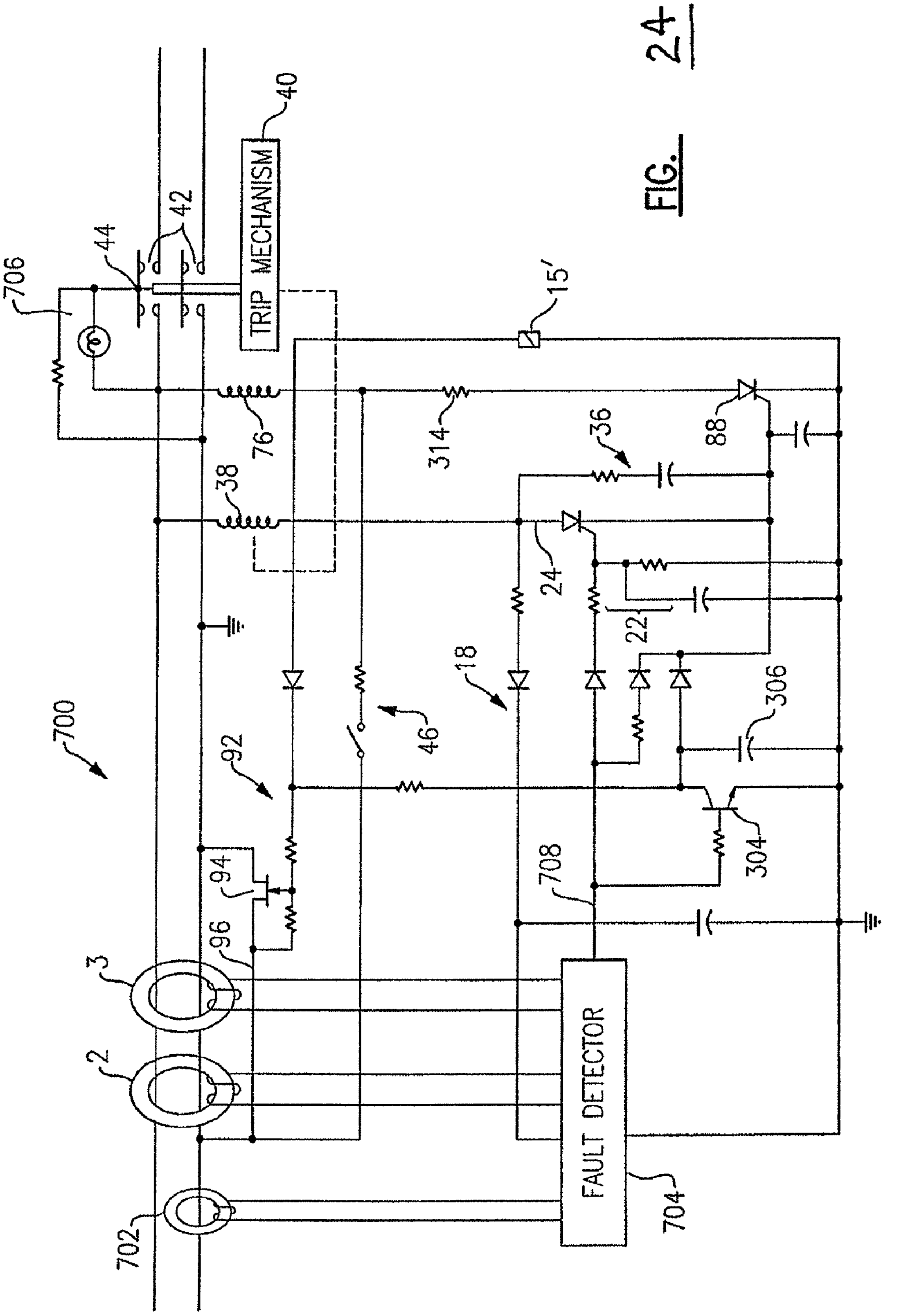
FIG. 24 is a schematic circuit diagram of another exemplary protective device.

Another exemplary circuit schematic is depicted in FIG. 24. Protective device 700 is configured to protect the electrical circuit from a plurality of fault conditions that include ground faults, grounded neutral faults, arc faults to ground, parallel arc faults between the line and neutral conductors, and series arc faults within a line or neutral conductor. Protective device 700 includes one or more additional sensors, such as sensor 702, to detect series arc faults and parallel line to neutral arc faults, since differential transformer 2 is configured to ignore all but differential currents. In one embodiment, sensor 702 is a current sensor configured to sense the current on the hot or neutral conductor. Fault detector 704 is similar to ground fault detector 16, but is also configured to detect and respond to other signals, such as arc recognition signatures. Output 708 operates in a manner similar to what has been described for output 20, but further provides trip signal for the above described fault conditions during the positive half cycle portions of the AC power source.

Other features illustrated in FIG. 24 include a trip indicator 706 that illuminates or annunciates when protective device 700 is tripped. The end of life lockout feature embodied in FIG. 24 allows solenoid 38 and power supply 18 to be connected to the line side of interrupting contacts 42 without sacrificing protection if solenoid 38 reaches end of life. In particular, solenoid 38 is configured to carry current only momentarily. A shorted or opened component may result in. a continuous current being supplied. For example, this may occur when SCR 24 is shorted out. Since solenoid 38 is not coupled to the AC power source through interrupting contacts 42, the opening of the contacts fails to limit the duration of the current to prevent overheating of the solenoid. However, the current flowing through solenoid 38 also flows through SCR 24. As a result, SCR 88 is activated and power is applied to end of life resistor 314. As described above, the resistor will be heated to a temperature greater than the melting point of the solder, or proximate adhesive, and the resistor 314 will fail. Of course, this results in a lock-out condition wherein interrupting contacts 42 are permanently opened. Thus, the end of life lockout feature is effective even if solenoid 38 is impaired through over activation.

In yet another feature, an auxiliary impedance 710, preferably including an inductance, couples power from the AC power source to polarity detector 92 and miswire network 46. The value of impedance 710 is chosen to be greater than 50 ohms in the presence of high frequency impulse noise on the electrical circuit, such as caused by lightning activity. The impedance permits a small metal oxide varistor 15', rated less than one Joule, to protect polarity detector 92 and miswire network 46 from damage. Likewise, the inductance of solenoid 38 is chosen such that snubber network 36 protects SCR 24 and power supply 18 from damage. The use of an auxiliary impedance in combination with other impedances, such as the impedance of a solenoid, is an alternative design that avoids using an across-the-line metal oxide varistor such as MOV 15 in FIG. 20. An across-the-line varistor is typically greater than 12 mm in size. The excessive size is a result of a requirement that the varistor successfully absorb the full energy of the voltage impulse. As shown, auxiliary impedance 710 is a stand-alone component, but could have been shown as sharing one of the magnetic cores of the inductors that have been previously described.

Like some of the previous embodiments described herein, GFCI 700 includes a wiring state detection circuit 46 which is shown in the '522 patent. Circuit 46 describes a wiring state detection indicator 706. The '522 patent includes four embodiments that further include various wiring state detection circuits and indicators, all of which are incorporated herein as though fully set forth in their entirety.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening.

The recitation of ranges of values herein are merely intended to serve as a shorthand method of referring individually to each separate value falling within the range, unless otherwise indicated herein, and each separate value is incorporated into the specification as if it were individually recited herein.

All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not impose a limitation on the scope of the invention unless otherwise claimed.

No language in the specification should be construed as indicating any non-claimed element as essential to the practice of the invention.

It will be apparent to those skilled in the art that various modifications and variations can be made to the present invention without departing from the spirit and scope of the invention. There is no intention to limit the invention to the specific form or forms disclosed, but on the contrary, the intention is to cover all modifications, alternative constructions, and equivalents falling within the spirit and scope of the invention, as defined in the appended claims. Thus, it is intended that the present invention cover the modifications and variations of this invention provided they come within the scope of the appended claims and their equivalents.

What is claimed is:

1. An electrical wiring device comprising:

a housing portion including a plurality of line terminals and a plurality of load terminals accessible from external portions thereof, the housing portion further including a separator member, the plurality of line terminals being disposed on a first side portion of the separator member, the plurality of load terminals also including a plurality of receptacle terminals disposed on a second side portion of the separator member;

a cover portion coupled to the housing portion, the cover portion including a plurality of receptacle openings selectively coupled to the plurality of line terminals in an operative state, the cover portion also comprising a user-accessible device control region disposed proximate the plurality of receptacle openings, the cover portion further comprising at least one lens cover opening, a portion of the at least one first lens cover opening having a first edge juxtaposed with the user-accessible device control region and a second edge substantially disposed along a peripheral edge of the cover portion;

an interrupting contact assembly including four sets of interrupting contacts that are configured to provide electrical continuity between the plurality of line terminals and the plurality of load terminals in a reset state and configured to interrupt the electrical continuity in a tripped state;

at least one detection circuit disposed in the housing portion on the first side portion of the separator member and coupled to the plurality of line terminals or the plurality of load terminals, the at least one detection circuit being configured such that the interrupting contact assembly is substantially prevented from effecting the reset state in the event of a miswired condition, an end-of-life condition, or a fault condition; and an illumination assembly coupled to the at least one detection circuit and disposed in the housing portion, the illumination assembly including at least one light emitting element, an illumination circuit, and at least one lens disposed in the at least one lens cover opening in optical communication with the at least one light emitting element, the illumination circuit being configured to selectively drive the at least one light emitting element between a deenergized state and a light emitting state in response to an ambient light condition, the miswire condition, the end-of-life condition, the reset state or the trip state, the at least one lens having a surface area that is a function of the first edge juxtaposed with the user-accessible device control region and the second edge substantially disposed along a peripheral edge of the cover portion such that light emitted by the at least one light emitting element is directed into a spatial volume proximate the electrical wiring device.

2. The device of claim 1, further comprising a reset assembly coupled to the interrupting contact assembly, the reset assembly including a reset button disposed in the user-accessible device control region.

3. The device of claim 1, further comprising a test circuit assembly coupled to, or integral with, the at least one detection circuit.

4. The device of claim 3, wherein the test circuit assembly includes a manual test button disposed in the user-accessible device control region.

5. The device of claim 3, wherein a simulated fault signal is generated in response to a depression of the test button.

6. The device of claim 3, wherein the test circuit assembly further comprises:

an automatic test circuit being configured to perform an automated test of the at least one detection circuit during a predetermined test period; and a checking circuit configured to determine whether the at least one detection circuit or portions of the interrupting contact assembly passed the automated test, the checking circuit being configured to substantially prevent the interrupting contact assembly from effecting the reset state in response to a failure of the automated test.

7. The device of claim 1, wherein the at least one light emitting element includes a plurality of light emitting elements.

8. The device of claim 7, wherein at least a portion of the plurality of light emitting elements includes an LED.

9. The device of claim 1, wherein the illumination circuit is configured to selectively drive the at least one light emitting element between a deenergized state and a light emitting state in response to a user input.

10. The device of claim 9, wherein the user input includes a user depression of a reset button.

11. The device of claim 1, wherein the illumination circuit is configured to selectively drive the at least one light emitting element from a deenergized state to a light emitting state when AC power is applied to the plurality of line terminals.

12. The device of claim 1, wherein the illumination circuit is configured to selectively drive the at least one light emitting element from a deenergized state to a light emitting state when the interrupting contacts are driven into the tripped state.

13. The device of claim 1, wherein the illumination circuit is configured to selectively drive the at least one light emitting element from a deenergized state to a light emitting state when the interrupting contacts are driven into the reset state.

14. The device of claim 1, wherein the illumination circuit is configured to selectively drive the at least one light emitting element from a deenergized state to a light emitting state when the miswire condition is detected.

15. The device of claim 1, wherein the illumination circuit is configured to selectively drive the at least one light emitting element from a deenergized state to a light emitting state when the end-of-life condition is detected.

16. The device of claim 1, wherein the at least one light emitting element is in the light emitting state irrespective of whether the interrupting contact assembly is in the reset state or the tripped state.

17. The device of claim 1, wherein a portion of the plurality of load terminals are disposed on the first side portion of the separator member.

18. The device of claim 1, wherein the at least one lens is characterized by a first dimension that is greater than or equal to about 0.4 inches, the first dimension being parallel to the longitudinal axis of the electrical wiring device.

19. The device of claim 18, wherein the lens element is characterized by a second dimension that is substantially equal to the width of the cover portion.

20. The device of claim 1, wherein the at least one lens includes a surface area substantially corresponding to one-third of the surface area of the cover portion.

21. The device of claim 1, wherein the at least one lens is disposed at one end portion of the cover portion, the plurality of receptacle openings including a set of receptacle openings disposed at an opposing end portion of the cover portion, and the user-accessible device control region being disposed between the at least one lens element and the set of receptacle openings.

22. The device of claim 1, wherein the at least one lens element includes a rectangular shape in a plane formed by a major surface of the cover portion.

23. The device of claim 1, wherein the at least one lens element includes a convex lens.

24. The device of claim 1, wherein the illumination assembly further comprises an ambient light sensor coupled to the illumination circuit, the illumination circuit being configured to drive the at least one light emitting element from the deenergized state to the light emitting state when an amount of ambient light detected by the ambient light sensor is less than or equal to a predetermined threshold, the illumination circuit also being configured to deenergize the at least one light emitting element when the amount of ambient light detected by the ambient light sensor is greater than the predetermined threshold.

25. The device of claim 24, wherein the ambient light sensor includes a light shielding structure configured to substantially prevent the light emitted by the light emitting element from being sensed by the ambient light sensor.

26. The device of claim 1, wherein the illumination assembly further comprises an ambient light sensor coupled to the illumination circuit, the illumination circuit being configured to drive the at least one light emitting element from the deenergized state to the light emitting state, the intensity of the light emitted by the at least one light emitting element being inversely related to the amount of ambient light detected by the ambient light sensor.

27. The device of claim 26, wherein the ambient light sensor includes a light shielding structure configured to substantially prevent the light emitted by the light emitting element from being sensed by the ambient light sensor.

28. The device of claim 1, wherein the at least one lens further comprises:

a first lens element disposed in the at least one lens cover opening, the first lens element having a surface area greater than or equal to 0.3 square inches such that light emitted by the at least one light emitting element is directed into a spatial volume proximate the electrical wiring device, the at least one light emitting element including a plurality of light emitting elements, the first lens element being in optical communication with a first portion of the plurality of light emitting elements; and a second lens element disposed on the cover portion in a region spatially separate from the first lens element, the second lens element being in optical communication with a second portion of the plurality of light emitting elements.

29. The device of claim 28, wherein the at least one detection circuit or the illumination circuit is configured such that the second portion of the plurality of light emitting elements comprises a trip state indicator, a reset indicator or an end-of-life indicator.

30. The device of claim 1, wherein at least one detection circuit is configured to detect a ground fault, an arc fault, a device wiring state, or an end-of-life fault.

31. The device of claim 30, wherein the device wiring state includes a miswiring condition or a proper wiring condition.

32. The device of claim 1, wherein the illumination assembly is disposed on the second side portion of the separator member.

33. The device of claim 1, further comprising:

a reset button disposed in the user-accessible device control region;

a mechanical linkage coupled to the reset button and the interrupting contact assembly, the mechanical linkage being configured to drive the interrupting contact assembly from the tripped state into the reset state in response to a depression of the reset button; and a lockout mechanism coupled to the mechanical linkage and the at least one detection circuit, the lockout mechanism being configured to disable the mechanical linkage in response to an end-of-life signal such that the interrupting contact assembly is prevented from entering the reset state.

34. The device of claim 33, further including a test button coupled to a test circuit, the test circuit being configured to generate a simulated fault signal in response to a depression of the test button, the test circuit being further configured to generate the end-of-life signal in the event that the at least one detection circuit or the interrupting contact assembly fail to respond to the simulated fault signal within a predetermined period of time.

35. The device of claim 34, wherein the lockout mechanism includes a fusible element and the end-of-life signal is current signal, the current signal being configured to open circuit the fusible element after the predetermined period of time elapses.

36. The device of claim 1, wherein the at least one detection circuit includes a wiring state detection circuit configured to generate a first signal in response to a proper wiring condition and a second signal in response to a miswire condition.

37. The device of claim 1, wherein the at least one light emitting element includes a secondary light emitting element disposed in optical communication with an aperture formed in the cover portion, the secondary light emitting element being selectively driven into the energized state in response to the interrupting contact assembly being in the tripped state.

38. The device of claim 1, wherein the at least one light emitting element includes a secondary light emitting element disposed in optical communication with an aperture formed in the cover portion, the secondary light emitting element being selectively driven into the energized state in response to the interrupting contact assembly being in the reset state.

39. The device of claim 1, wherein the at least one light emitting element includes a secondary light emitting element disposed in optical communication with an aperture formed in the cover portion, the secondary light emitting element being selectively driven into the energized state in response to the device being in the end-of-life condition.

* * * * *